US010956052B1

(12) United States Patent
Chen et al.

(10) Patent No.: US 10,956,052 B1
(45) Date of Patent: Mar. 23, 2021

(54) ONLINE ADDRESS TO HASH (A2H) METADATA SCANNER

(71) Applicant: EMC IP Holding Company LLC, Hopkinton, MA (US)

(72) Inventors: Xiangping Chen, Sherborn, MA (US); Ying Hu, Northborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/656,170

(22) Filed: Jul. 21, 2017

(51) Int. Cl.
*G06F 3/06* (2006.01)

(52) U.S. Cl.
CPC ............ *G06F 3/0619* (2013.01); *G06F 3/067* (2013.01); *G06F 3/0632* (2013.01)

(58) Field of Classification Search
CPC ....... G06F 3/0619; G06F 3/0632; G06F 3/067
See application file for complete search history.

(56) References Cited

U.S. PATENT DOCUMENTS

| | | | |
|---|---|---|---|
| 7,475,124 B2 | 1/2009 | Jiang et al. | |
| 8,327,103 B1 | 12/2012 | Can et al. | |
| 8,380,928 B1 | 2/2013 | Chen et al. | |
| 8,429,346 B1 | 4/2013 | Chen et al. | |
| 8,515,911 B1 | 8/2013 | Zhou et al. | |
| 8,539,148 B1 | 9/2013 | Chen et al. | |
| 8,566,483 B1 | 10/2013 | Chen et al. | |
| 8,583,607 B1 | 11/2013 | Chen et al. | |
| 8,683,153 B1 | 3/2014 | Long et al. | |
| 8,712,976 B1 | 4/2014 | Chen et al. | |
| 8,713,270 B2 | 4/2014 | Havewala et al. | |
| 8,775,388 B1 | 7/2014 | Chen et al. | |
| 8,782,324 B1 | 7/2014 | Chen et al. | |
| 8,799,601 B1 | 8/2014 | Chen et al. | |
| 8,909,887 B1 | 12/2014 | Armangau et al. | |
| 8,930,746 B1 | 1/2015 | Chen et al. | |
| 8,954,699 B1 | 2/2015 | Chen et al. | |
| 8,977,812 B1 | 3/2015 | Chen et al. | |
| 9,152,336 B1 | 10/2015 | Chen et al. | |

(Continued)

OTHER PUBLICATIONS

U.S. Appl. No. 15/656,168, filed Jul. 21, 2017, 42 pages.

(Continued)

*Primary Examiner* — Tuan V Thai
*Assistant Examiner* — Alexander J Yoon
(74) *Attorney, Agent, or Firm* — Daly Crowley Mofford & Durkee, LLP

(57) ABSTRACT

A storage system is configured to comprise a processor in operable communication with a storage device and a metadata journal comprising metadata configured to store information associated with a change to be made to information stored on the storage device. While the storage system is booted up and responsive to I/O requests from a host, a scan is performed of a first portion of metadata that is loaded into storage system memory during the bootup, to check for existence of a metadata inconsistency condition comprising at least one of: (a) dirty tree (DT) entries in the metadata associated with an invalid logical unit (LU) index; (b) hash tree (HT) entries in the metadata which do not have corresponding DT bits; and (c) DT bits set without having a corresponding HT entry. Based on the results of the first scan, a determination is made about whether a first metadata inconsistency condition exists.

20 Claims, 11 Drawing Sheets

(56) References Cited

U.S. PATENT DOCUMENTS

| | | |
|---|---|---|
| 9,208,162 B1 | 12/2015 | Hallak et al. |
| 9,304,889 B1 | 4/2016 | Chen et al. |
| 9,311,333 B1 | 4/2016 | Pawar et al. |
| 9,355,112 B1 | 5/2016 | Armangau et al. |
| 9,384,206 B1 | 7/2016 | Bono et al. |
| 9,395,937 B1 | 7/2016 | Si et al. |
| 9,449,011 B1 | 9/2016 | Chen et al. |
| 9,459,809 B1 | 10/2016 | Chen et al. |
| 9,460,102 B1 | 10/2016 | Bono et al. |
| 9,477,431 B1 | 10/2016 | Chen et al. |
| 9,513,814 B1 | 12/2016 | Can et al. |
| 9,529,545 B1 | 12/2016 | Bono et al. |
| 9,542,125 B1 | 1/2017 | Chen |
| 9,594,514 B1 | 3/2017 | Bono et al. |
| 9,665,305 B1 | 5/2017 | Natanzon et al. |
| 9,684,593 B1 | 6/2017 | Chen et al. |
| 9,710,187 B1 | 7/2017 | Si et al. |
| 9,811,288 B1 | 11/2017 | Chen et al. |
| 9,817,766 B1 | 11/2017 | Si et al. |
| 10,037,369 B1 | 7/2018 | Bono et al. |
| 10,082,959 B1 | 9/2018 | Chen et al. |
| 10,095,428 B1 | 10/2018 | Meiri et al. |
| 10,152,381 B1 | 12/2018 | Shvaiger et al. |
| 10,176,046 B1 | 1/2019 | Hu et al. |
| 10,235,066 B1 | 3/2019 | Chen et al. |
| 10,248,623 B1 | 4/2019 | Chen et al. |
| 10,261,853 B1 | 4/2019 | Chen et al. |
| 10,310,951 B1 | 6/2019 | Chen et al. |
| 10,324,640 B1 | 6/2019 | Chen et al. |
| 10,338,851 B1 | 7/2019 | Kronrod et al. |
| 10,353,616 B1 | 7/2019 | Tao et al. |
| 10,359,968 B1 | 7/2019 | Chen et al. |
| 10,374,792 B1 | 8/2019 | Meiri et al. |
| 10,394,485 B1 | 8/2019 | Chen et al. |
| 10,402,283 B1 | 9/2019 | Chen et al. |
| 10,409,493 B1 | 9/2019 | Kucherov et al. |
| 10,459,632 B1 | 10/2019 | Chen et al. |
| 10,459,883 B1 | 10/2019 | Meiri et al. |
| 10,496,489 B1 | 12/2019 | Chen et al. |
| 10,496,668 B1 | 12/2019 | Meiri et al. |
| 10,496,672 B2 | 12/2019 | Meiri et al. |
| 10,565,058 B1 | 2/2020 | Meiri et al. |
| 10,606,670 B2 | 3/2020 | Zhao et al. |
| 2013/0024600 A1* | 1/2013 | Wakrat ............... G06F 12/0246 711/103 |
| 2013/0204961 A1 | 8/2013 | Fliam et al. |
| 2014/0089264 A1* | 3/2014 | Talagala ............. G06F 11/1471 707/649 |
| 2014/0149664 A1* | 5/2014 | Ezra ..................... G06F 3/0614 711/114 |
| 2014/0337562 A1 | 11/2014 | Long et al. |
| 2016/0335134 A1 | 11/2016 | Gupta et al. |
| 2018/0011893 A1 | 1/2018 | Kimura |
| 2018/0137014 A1* | 5/2018 | Li ....................... G06F 11/1458 |
| 2018/0203614 A1 | 7/2018 | Aronovich et al. |
| 2018/0276392 A1* | 9/2018 | Hoogerbrugge ...... H04L 9/0897 |

OTHER PUBLICATIONS

U.S. Appl. No. 16/048,767, filed Jul. 30, 2018, Chen et al.
U.S. Appl. No. 16/169,202, filed Oct. 24, 2018, Chen et al.
U.S. Appl. No. 16/177,782, filed Nov. 1, 2018, Hu et al.
U.S. Appl. No. 16/167,858, filed Oct. 23, 2018, Chen et al.
U.S. Appl. No. 16/175,979, filed Oct. 31, 2018, Hu et al.
U.S. Appl. No. 16/157,528, filed Oct. 11, 2018, Chen et al.
U.S. Appl. No. 16/162,786, filed Oct. 17, 2018, Hu et al.
U.S. Appl. No. 16/164,005, filed Oct. 18, 2018, Chen et al.
U.S. Appl. No. 16/264,825, filed Feb. 1, 2019, Chen et al.
U.S. Appl. No. 16/254,899, filed Jan. 23, 2019, Chen et al.
U.S. Appl. No. 16/254,897, filed Jan. 23, 2019, Chen et al.
U.S. Appl. No. 16/264,982, filed Feb. 1, 2019, Chen et al.
U.S. Appl. No. 16/263,414, filed Jan. 31, 2019, Meiri et al.
U.S. Appl. No. 15/076,775, filed Mar. 22, 2016, Chen et al.
U.S. Appl. No. 15/085,188, filed Mar. 30, 2016, Meiri et al.
U.S. Appl. No. 15/499,943, filed Apr. 28, 2017, Kucherov et al.
U.S. Appl. No. 15/499,935, filed Apr. 28, 2017, Chen et al.
U.S. Appl. No. 15/499,949, filed Apr. 28, 2017, Chen et al.
U.S. Appl. No. 15/499,947, filed Apr. 28, 2017, Kucherov et al.
U.S. Appl. No. 15/499,951, filed Apr. 28, 2017, Chen et al.
U.S. Appl. No. 15/656,168, filed Jul. 21, 2017, Hu et al.
U.S. Appl. No. 15/797,324, filed Oct. 30, 2017, Chen et al.
U.S. Appl. No. 15/885,027, filed Jan. 31, 2018, Chen et al.
U.S. Appl. No. 16/042,363, filed Jul. 23, 2018, Chen et al.
U.S. Appl. No. 16/038,543, filed Jul. 18, 2018, Chen et al.
U.S. Appl. No. 16/398,595, filed Apr. 30, 2019, Kucherov et al.
U.S. Appl. No. 16/375,001, filed Apr. 4, 2019, Chen et al.
U.S. Appl. No. 16/380,087, filed Apr. 10, 2019, Kronrod et al.
U.S. Appl. No. 16/592,271, filed Oct. 3, 2019, Chen et al.
U.S. Appl. No. 16/592,328, filed Oct. 3, 2019, Barabash et al.
U.S. Appl. No. 16/667,453, filed Oct. 29, 2019, Chen et al.
U.S. Appl. No. 16/668,661, filed Oct. 30, 2019, Kronrod et al.
U.S. Appl. No. 16/743,274, filed Jan. 15, 2020, Chen et al.
U.S. Appl. No. 16/747,169, filed Jan. 20, 2020, Chen et al.
U.S. Appl. No. 16/786,422, filed Feb. 10, 2020, Kronrod et al.
U.S. Appl. No. 16/788,461, filed Feb. 12, 2020, Chen et al.
U.S. Appl. No. 16/773,303, filed Jan. 27, 2020, Hu et al.
U.S. Appl. No. 16/511,676, filed Jul. 15, 2019, Chen et al.
U.S. Appl. No. 16/808,943, filed Mar. 4, 2020, Parasnis et al.
U.S. Non-Final Office Action dated Mar. 30, 2020 for U.S. Appl. No. 15/656,168; 23 Pages.
Response to U.S. Non-Final Office Action dated Mar. 30, 2020 for U.S. Appl. No. 15/656,168; Response filed May 4, 2020; 24 Pages.
U.S. Notice of Allowance dated May 12, 2020 for U.S. Appl. No. 15/656,168; 10 Pages.
U.S. Non-Final Office Action dated Dec. 3, 2020 for U.S. Appl. No. 16/398,595; 26 Pages.

* cited by examiner

US 10,956,052 B1

ONLINE ADDRESS TO HASH (A2H) METADATA SCANNER

FIELD

This application relates at least generally to devices, systems, and methods for data storage in computer systems. More particularly, this application relates at least to ways to improve metadata consistency.

BACKGROUND

Computer data is vital to today's organizations, and content addressable storage systems (such as DELL EMC XTREMIO)(hereinafter "XtremIO") can support a rich set of advanced data services such as single data instance, compression, snapshots, etc., by decoupling storage access, logical volume address space, and physical on-disk location of data. In systems such as this, volume and physical layout metadata can offer tremendous flexibility in decoupling and virtualization. Logical volume metadata used with these systems can provide flexible mapping from logical address to data content references, also known as a hash handle. The logical volume metadata also can make snapshot and dingle instance storage operations highly efficient.

In network environments where high-availability is a necessity, system administrators am constantly faced with the challenges of preserving data integrity and ensuring availability of critical system components, such as data systems and file systems. A significant part of protection of computer data against disasters is focused on data protection and on providing ways for computer systems to recover from disasters and other disruptions. Storage systems sometimes experience failures. For example, a storage device, such as a disk drive, may malfunction making the data stored therein inaccessible (at least temporarily). In addition, data and/or metadata stored on a storage system, or used by a storage system, may become corrupted. To protect against data loss as result of data and/or metadata corruption, file system corruption, and/or hardware failure, storage systems frequently use one or more protection strategies, such as mirroring and use of RAID (Redundant Array of Independent Disks), by taking systems offline to run diagnostic tools, perform manual corrections, etc. These solutions do not always detect all issues and can be limiting because they limit access to the computer system. In addition, these solutions do not always detect corruption issues until an application or other entity interacting with the storage system already has had issues with data corruption.

SUMMARY

This Summary is provided to introduce a selection of concepts in a simplified form, to provide a basic understanding of one or more embodiments that are further described below in the Detailed Description. This Summary is not intended to identify key features or essential features of the claimed subject matter, nor is it intended to be used to limit the scope of the claimed subject matter.

In certain embodiments, a computer-implemented method is provided. A storage system is configured to comprise a processor in operable communication with a storage device, the storage system responsive to input/output (I/O) requests to the storage device from a host in operable communication with the storage system and comprising a metadata journal comprising metadata configured to store information associated with at least one change to be made to information stored on the storage device. While the storage system is booted up and able to be responsive to I/O requests, a first scan is performed of at least a first portion of metadata that is loaded into storage system memory during the bootup, the first scan configured to check for the existence of a metadata inconsistency condition comprising one or more of the following metadata inconsistency sub-conditions: (a) dirty tree (DT) entries in the metadata which are associated with an invalid logical unit (LU) index; (b) hash tree (HT) entries in the metadata which do not have corresponding DT bits; and (c) DT bits set without having a corresponding HT entry. Based at least in part on the results of the first scan, a determination is made about whether a first metadata inconsistency condition exists.

In certain embodiments, a notification can be generated if a first metadata condition exists. In certain embodiments, a first set of actions can be taken to correct the first metadata inconsistency condition. In certain embodiments, the first scan comprises a scan for a respective one of the (a), (b), and (c) metadata inconsistency sub-conditions and, based on the results of the first scan, a determination is made as to whether a second scan of at least a second portion of metadata that is loaded into storage system memory during the bootup, needs to take place. In certain embodiments, the second scan can be configured to scan the same respective one of the (a), (b), and (c) metadata inconsistency sub-conditions as was scanned during the first scan.

In certain embodiments, a system is provided, comprising a processor; and a non-volatile memory in operable communication with the processor and storing computer program code that when executed on the processor causes the processor to execute a process operable to perform operations. One operation comprises configuring a storage system comprising a processor in operable communication with a storage device, the storage system responsive to input/output (I/O) requests to the storage device from a host in operable communication with the storage system, the storage system comprising a metadata journal comprising metadata configured to store information associated with at least one change to be made to information stored on the storage device. Another operation comprises performing, while the storage system is booted up and able to be responsive to I/O requests, a first scan of at least a first portion of metadata that is loaded into storage system memory during the bootup, the first scan configured to check for the existence of a metadata inconsistency condition comprising one or more of the following metadata inconsistency sub-conditions: (a) dirty tree (DT) entries in the metadata which are associated with an invalid logical unit (LU) index; (b) hash tree (HT) entries in the metadata which do not have corresponding DT bits; and (c) DT bits set without having a corresponding HT entry. Another operation comprises determining, based at least in part on the results of the first scan, whether a first metadata inconsistency (a) condition exists.

In certain embodiments, a computer program product is provided, the computer program product including a non-transitory computer readable storage medium having computer program code encoded thereon that when executed on a processor of a computer causes the computer to operate a storage system. The computer program product comprises computer program code computer program code for configuring a storage system comprising a processor in operable communication with a storage device, the storage system responsive to input/output (I/O) requests to the storage device from a host in operable communication with the storage system and comprising a metadata journal comprising metadata configured to store information associated with at least one change to be made to information stored on the storage device. The computer program product also comprises computer program code for performing, while the storage system is booted up and able to be responsive to I/O requests, a first scan of at least a first portion of metadata that is loaded into storage system memory during the bootup, the first scan configured to check for the existence of a metadata inconsistency condition comprising one or more of the following metadata inconsistency sub-conditions: (a) dirty tree (DT) entries in the metadata which are associated with an invalid logical unit (LU) index, (b) hash tree (HT) entries in the metadata which do not have corresponding DT bits; and (c) DT bits set without having a corresponding HT entry. The computer program product also comprises computer program code for determining, based at least in part on the results of the first scan, whether a first metadata inconsistency condition exists.

Details relating to these and other embodiments are described more fully herein.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1A:
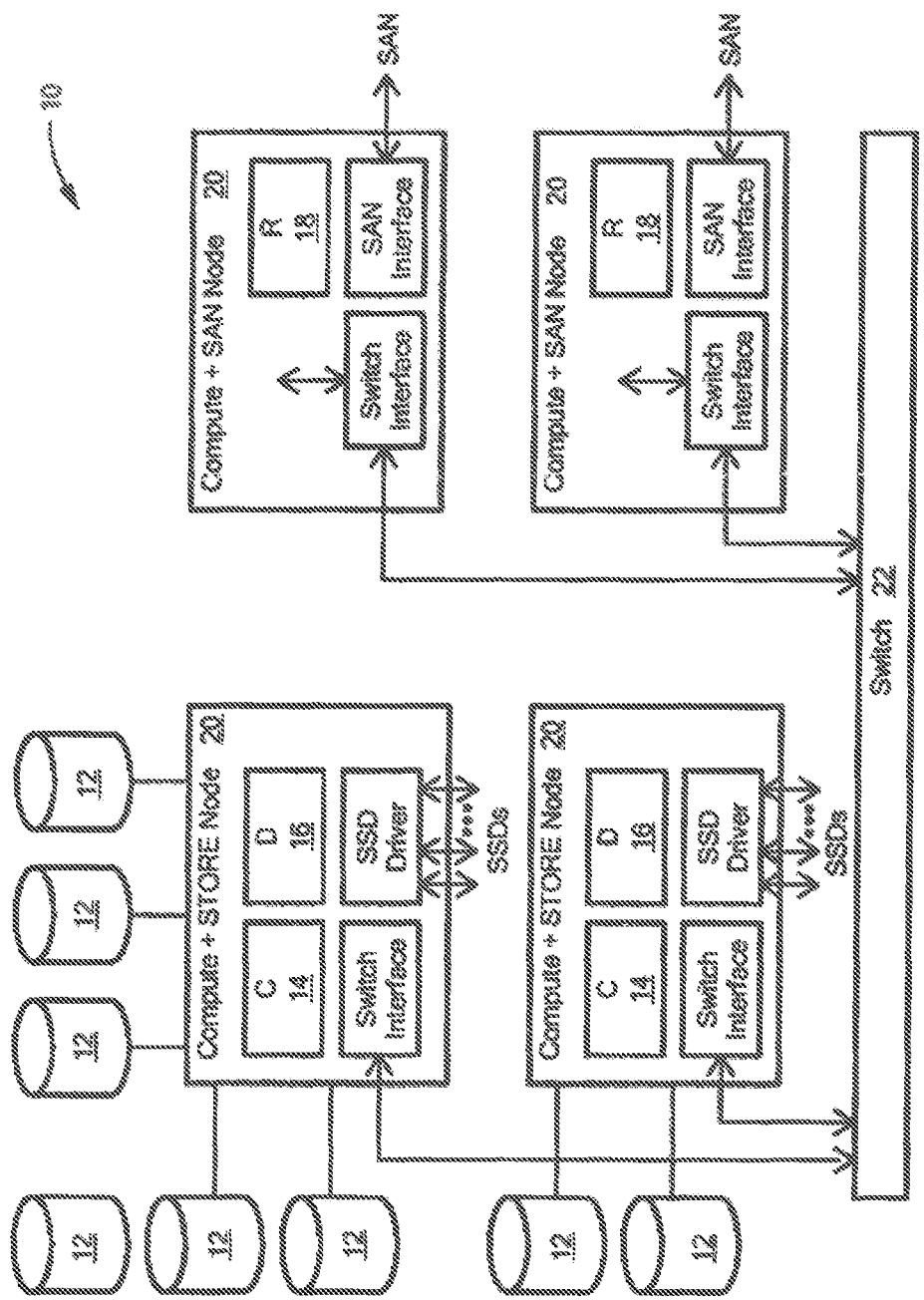
FIG. 1A is a simplified diagram schematically illustrating a distributed storage system for data storage, having separate control and data planes, in accordance with at least one illustrative embodiment of the disclosure.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage army including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium.

In certain embodiments, the term "I/O request" or simply "I/O" may be used to refer to an input or output request, such as a data read or data write request, which can originate at a host, at a user, or at any other entity in operable communication with a computer system.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN)(also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines. LUNs can be divided into smaller logical areas, to balance the load between system modules, where each such small logical area is called a sub-LUN.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, an image may be a copy of a logical storage unit at a specific point in time. In certain embodiments, a clone may be a copy or clone of the image or images, and/or drive or drives of a first location at a second location. In some embodiments, a clone may be made up of a set of objects.

In certain embodiments, a snapshot may refer to differential representations of an image, i.e. the snapshot may have pointers to the original volume, and may point to log volumes for changed locations. In certain embodiments, a snapshot may refer to differential representations of the state of a system. Snapshots may be combined into a snapshot array, which may represent different images over a time period or different states of a system over a time period. In certain embodiments, snapshots may be taken from the original source address range as well as from previous snapshots acting as new sources. Snapshots can be arranged into a hierarchy such as a tree, in certain embodiments, with each respective snapshot considered to be a leaf of the tree. Alternately, snapshots can be arranged into a type of tree where there is a tree per snapshot. In another alternative, snapshots can be viewed as part of an array and viewed "by row" or "by column." With arrangement by row, the snapshots are arranged so that they are part of a tree of snapshots, where each leaf of the tree corresponds to another tree of addresses in that snapshot. With arrangement by column, snapshots can be arranged such that there is a tree of addresses, where each leaf contains a tree of snapshots which contain that address.

In certain embodiments, a journal may be a record of write transactions (e.g., I/O data) issued to a storage system, which may be used to maintain a duplicate storage system, and to roll back the duplicate storage system to a previous point in time. In some embodiments, each entry in a journal contains, apart from the I/O data itself, I/O metadata that can include information such as a volume identifier (ID), the I/O block offset within the volume, the I/O length, and a time stamp of the I/O.

In certain embodiments, XtremIO, available from Dell EMC of Hopkinton, Mass.) is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random I/O data.

In certain embodiments, an X-page is a predetermined-size aligned chunk as the base unit for memory and disk operations. In certain embodiments described in the present description, the X-Page size is referred to as having 4 KB; however other smaller or larger values can be used as well, and nothing in the design is limited to a specific value.

In certain embodiments, a logical X-page address is the logical address of an X-page, containing a LUN identifier as well as the offset of the X-page within the LUN.

It is envisioned that at least some embodiments herein are usable with one or more of the embodiments described in certain commonly owned U.S. patents, including: U.S. Pat. No. 9,141,290 ("Snapshot Mechanism"); U.S. Pat. No. 8,990,495 ("Method and System for Storing Data in RAID Memory Devices"); U.S. Pat. No. 9,104,326 ("Scalable Block Data Storage Using Content Addressing") (hereinafter "'326 patent"); and U.S. Pat. No. 9,606,870 ("Data Reduction Techniques in a Flash-Based Key/Value Cluster Storage"), each of which is hereby incorporated by reference.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants is not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

As discussed further herein, in certain embodiments, tools (which in certain embodiments may include systems, methods, and/or apparatuses) are provided to provide online metadata scanning and/or online background disk metadata scanning, to help detect and/or correct metadata inconsistencies. In at least some of these embodiments, the methods, systems, and apparatuses enable lightweight early detection of disk metadata inconsistency, and provide a safe way to automatically correct (if desired) the inconsistency without impact to user or host I/O or application data access. Before discussing these embodiments, a brief overview of the distributed storage system, in which at least some embodiments can be implemented, is now provided.

FIG. 1A illustrates a system 10 for scalable block data storage and retrieval using content addressing, which is usable in accordance with certain embodiments described herein. The system 10 includes data storage devices 12 on which the data blocks are stored. The storage devices 12 are networked to computing modules, there being several kinds of modules, including control modules 14 and data modules 16. The modules carry out content addressing for storage and retrieval, and the network defines separate paths or planes, control paths or a control plane which goes via the control modules 14 and data paths or a data plane which goes via the data modules 16.

The control (C) modules 14 may control execution of read and write commands. The data (D) modules 16 are connected to the storage devices 20 and, under control of a respective control module, pass data to or from the storage devices. Both the C and D modules 14, 16, respectively, may retain extracts of the data stored in the storage device, and the extracts may be used for the content addressing. Typically the extracts may be computed by cryptographic hashing of the data, as will be discussed in greater detail below, and hash modules (H) (FIG. 2) may specifically be provided for this purpose. That is to say the hash modules calculate hash values for data which is the subject of storage commands, and the hash values calculated may later be used for retrieval.

Routing modules 18 may terminate storage and retrieval operations and distribute command parts of any operations to control modules that are explicitly selected for the operation in such a way as to retain balanced usage within the system 10. The routing modules 18 may use hash values, calculated from data associated with the operations, to select the control module for the distribution. More particularly, selection of the control module may use hash values, but typically relies on the user address and not on the content (hash). The hash value is, however, typically used for selecting the Data (D) module 16, and for setting the physical location for data storage within a D module 16.

The storage devices 12 may be solid-state random access storage devices, as opposed to spinning disk devices; however disk devices may be used instead or in addition. A deduplication feature may be provided. The routing modules 18 and/or data modules 16 may compare the extracts or hash values of write data with hash values of already stored data, and where a match is found, simply point to the matched data and avoid rewriting. The modules are combined into nodes 20 on the network, and the nodes are connected over the network by a switch 22.

The use of content addressing with multiple data modules selected on the basis of the content hashing and a finely grained mapping of user addresses to Control Modules, allows for a scalable distributed architecture.

Figure 1B:
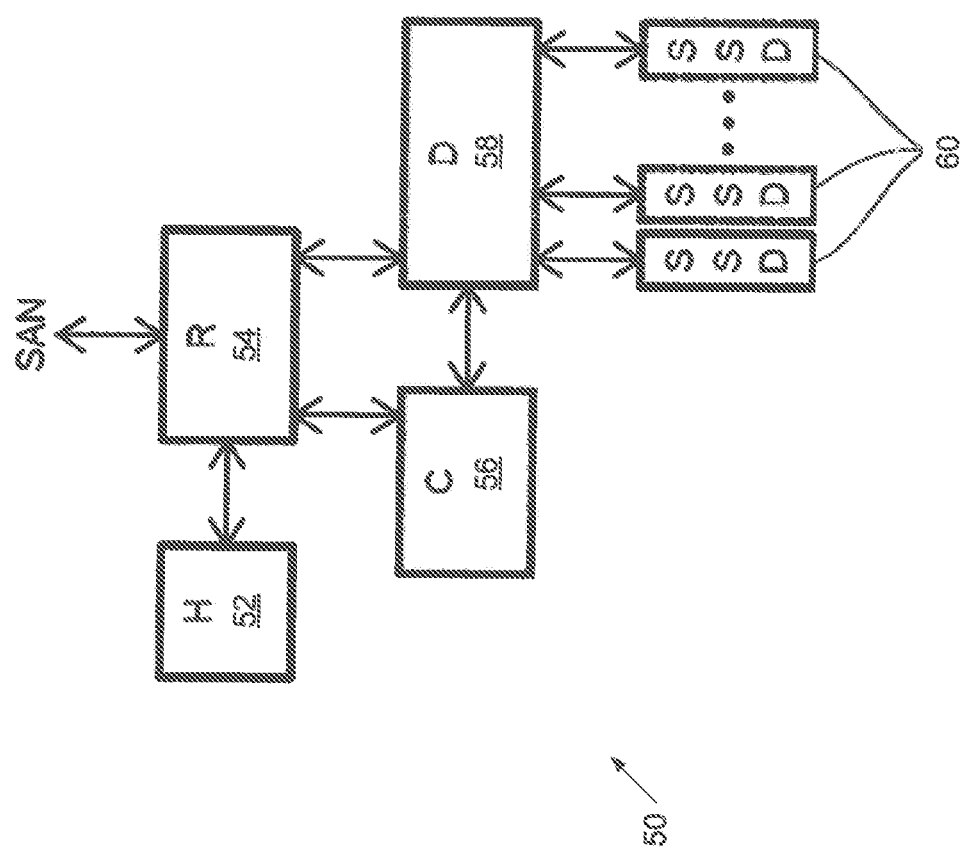
FIG. 1B is an exemplary configuration of modules for the distributed storage system of FIG. 1, in accordance with at least one illustrative embodiment of the disclosure.

FIG. 1B is a functional block diagram of a system 50 in which a Hash (H) module 52 is connected to a routing (R) module 54. The R module 54 is connected to both Control 56 and data 58 modules. The data module 58 is connected to any number of memory devices (e.g., solid-state devices (SSD)) 60.

A function of the H module 52 is to calculate the Hash function value for a given block of data, e.g., data which is the subject of storage commands. The hash values calculated may later be used for retrieval. The Hash function may be based on standards based hash functions such as SHA-1 and MD5, or based on a proprietary function, but this is not limiting. The hash function is selected, in certain embodiments, to generate a uniformly distributed output over the range of potential input values. In certain embodiments, H modules 52 share nodes with an R module 54, but that is not limiting. More generally, the H modules 52 can reside in certain nodes, in all nodes, together with R modules 54, or together with C modules 56 or D modules 58.

A function of the R module 54 is to terminate storage area network (SAN) Read/Write commands and route them to appropriate C and D modules 56, 58, for execution by these modules. By doing so, the R module 54 can distribute workload over multiple C and D modules 56, 58, and at the same time create complete separation of the Control and Data planes, that is to say provide separate control and data paths. In certain embodiments, the R module 54 routes SCSI I/O request to the C modules 56, guarantees execution, and returns the result. In certain embodiments, the R module 54 maintains an up to date data structure called an address-to-control module (A→C or A2C) table, coordinated with the management back end (MBD), indicating which C module 56 is responsible for each logical X-page address (LXA), and also showing a balance a range of all possible LXAs between available C modules 56. In certain embodiments, for write operations, the R module 54 instructs the calculation of a hash digest for each X-page by requesting such calculation from a hash calculation module (e.g., the H module 52).

A function of the C module 56 is to control the execution of a Read/Write (R/W) command, as well as other storage functions implemented by the system. The C module 56 also may maintain and manage key metadata elements. In certain embodiments, the C module 56 receives an I/O request from an R module 54 on a certain sub-LUN (SL), guaranteeing its atomic execution (i.e., execution independent of other processes) and returns the result to the R module 54. The C module 56 also communicates with D modules 58 to execute the I/O requests. In addition, the C module 56 monitors the disk content of its logical space by associating each LXA with its hash digest; and balances the work load between the D modules for the SLs that the C module 56 is maintaining. The C module 56 and data module 58 each maintains certain data structures and corresponding metadata journals for those data structures. For example, the C module 56 maintains an "address to hash" table (A2H table, also referred to herein as A→H table) and corresponding A2H metadata journal, in the C module 56. The D module 58 maintains the "hash to physical location of data" table (H2P table, also referred to herein as H→P table) and its corresponding metadata journal in the D module 58. That is, in certain embodiments, the in-memory copy of a journal is in the same module as the corresponding metadata table. In certain embodiments, the on-disk journal copy is persisted and mirrored across nodes in the cluster in journal disk chunks.

The A2H table maps each LXA that belongs to the SLs that the C module 56 is responsible for, to the hash digest representing the X-page Data that currently resides in that address. The C module 56 maintains an A2H table in a persistent way. The C module 56 may initiate requests to D modules 58 in order to save table pages to disk and read them from disk. In addition, to avoid frequent disk operations, the C module 56 maintains a journal certain of the latest table operations. These journals include (but are not limited to) the A2H metadata journals (A2H Hash tree) and dirty tree update metadata journals. As discussed below, the data module (D) takes charge of Hash Metadata (HMD), physical layout (PL) metadata, hash to physical layout (H2P) mapping, H2P metadata journals, on disk block allocation (3WBM) and disk block allocation bitmap (3WBM) journals, as discussed further herein. For example, in certain embodiments, the metadata journals include information associated with time-based changes to information in the respective A2H and H2P tables and time based changes to the disk block allocation bitmap.

The H2P table maps each range of hash digests to the corresponding D module 58 responsible for that range. The H2P table balances the range of all possible hash digests between the available D modules 58.

A function of the D module 58 is to perform the actual R/W operation by accessing the storage devices 60 attached to it. The D module 58 may maintain metadata related with the physical location of data blocks. In certain embodiments, the D module 58 is responsible for: maintaining a set of LUNs which are attached locally and performing all I/O operations on these LUN; managing the physical layout of the attached LUNs; managing the mapping between X-Page Data hash digests and their physical location in a persistent way; managing deduplication of X-Page Data in a persistent way; and receiving disk I/O requests from C modules 56, perform them and returning a result.

In certain embodiments, the D module 58 is also responsible for, for each write operation, backing up the X-Page Data in the designated D backup module and performing read-modify operations for writes that are smaller than X-Page size (This process also involves, in certain embodiments, computing a hash digest for these X-Pages). In certain embodiments, the D module 58 maintains an up-to-date H→(D, $D_{backup}$) table coordinated with the MBE, where the H→(D, $D_{backup}$) table is expected to balance the range of all possible hash digests between the available D modules 58.

Balancing between the D modules is based on hashing of the content. For example, in certain embodiments, the D module 58 makes use of a hash digest metadata table. The hash digest meta data table maps each in use hash digest, that represents actual X-Page Data, to its meta data information including its physical page on the storage media (SSD), its memory copy (if exists), a mapping to any backup memory copy and a reference count for the purpose of deduplication. The D modules 58 manage a separate nonvolatile memory pool (NVRAM or UPS protected) for X-Page Data backup purposes. The backup holds X-Pages that are held in memory of the D primary and have not yet been destaged. This is an example of the user data destage cache (UDC). There are dirty X-pages waiting to be persisted on disk. When re-balancing between D modules 58 occurs (due to a D module 58 failure for example), the D module 58 may communicate with other D modules 58 in order to create new backup copies or move a primary ownership as required.

The D modules 58 allow deduplication per X-Page Data by maintaining a persistent reference count that guarantees only one copy per X-Page Data. The D modules 58 manage the hash digest metadata table in a persistent way. The table is coordinated with the physical layout for physical pages allocation, with the memory pointer, memory backup pointer, and deduplication reference count.

As will be appreciated, the R, C, D, and H modules 52-58 may be implemented in software, and executed on a physical node. In addition, the aforementioned '326 patent provides information relating to additional functionality of the R, C, D, and H modules 52-58, in certain embodiments.

Figure 1C:
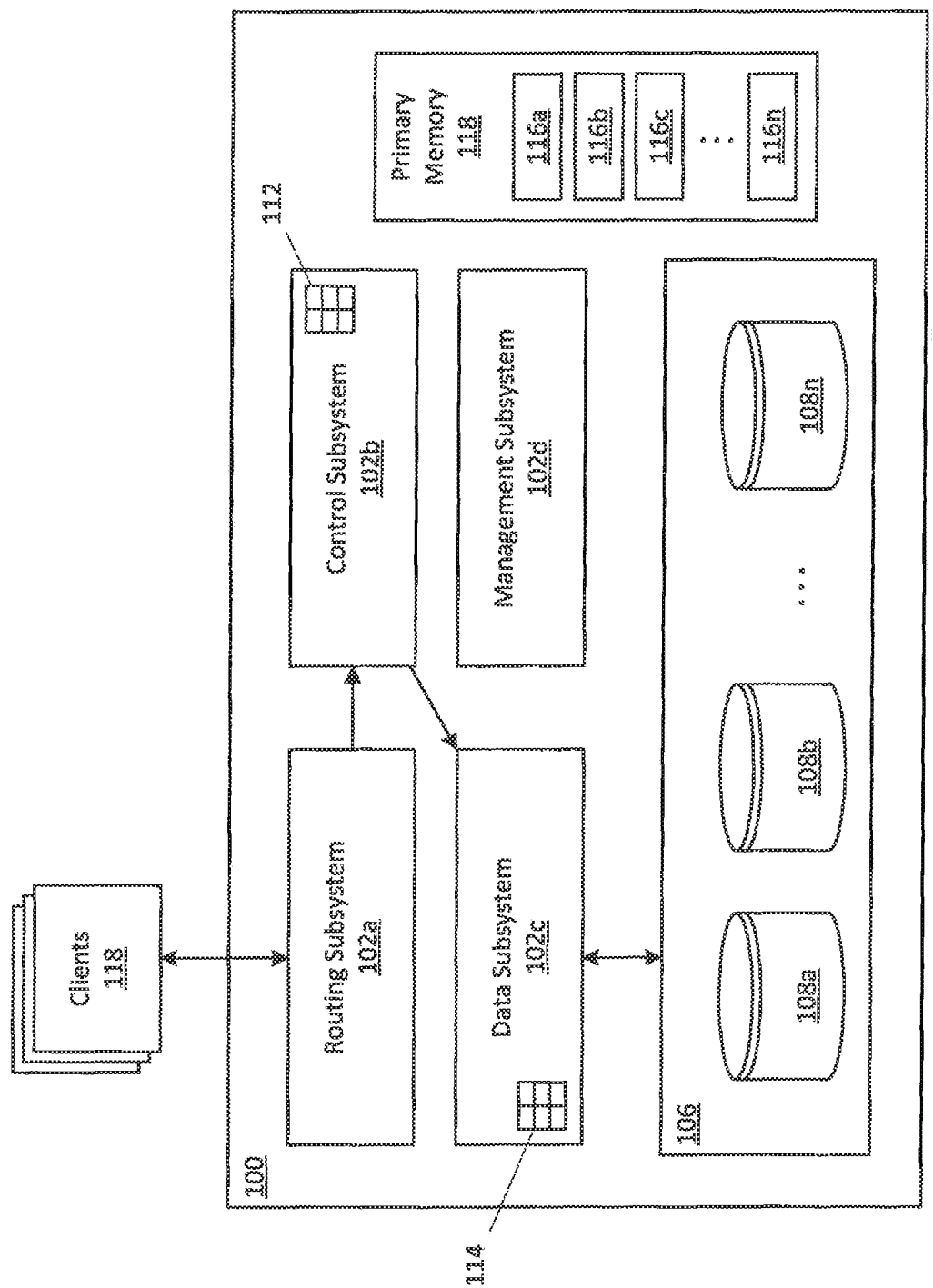
FIG. 1C is a simplified block diagram showing a storage system in accordance with at least one illustrative embodiment of the disclosure.

FIG. 1C shows a storage system 100 according to an illustrative embodiment of the disclosure. The storage system 100 may be the same as or similar to a node 20 within the distributed storage system 10 of FIG. 1A and/or the system 50 of FIG. 1B. The storage system 100 may include a plurality of subsystems 102a-102d (generally denoted 102 herein), a storage array 106 comprising a plurality of storage devices 108a . . . 108n (generally denoted 108 herein), and a primary memory 118. In some embodiments, the storage devices 108 may be provided as random access storage devices, such as solid-state devices (SSDs).

The primary memory 118 can be any type of memory having access times that are significantly faster compared to the storage devices 108. In some embodiments, primary memory 118 may be provided as dynamic random-access memory (DRAM). In certain embodiments, primary memory 118 may be provided as synchronous DRAM (SDRAM). In one embodiment, primary memory 118 may be provided as double data rate SDRAM (DDR SDRAM), such as DDR3 SDRAM.

In the embodiment shown, the subsystems 102 include a routing subsystem 102a, a control subsystem 102b, a data subsystem 102c, and a management subsystem 102d. In one embodiment, subsystems 102 may be provided as software components, i.e., computer program code that, when executed on a processor, may cause a computer to perform functionality described herein. In a certain embodiment, the storage system 100 includes an operating system (OS) and one or more of the subsystems 102 may be provided as user space processes executable by the OS. In other embodiments, the subsystems 102 may be provided, at least in part, as hardware, such as digital signal processor (DSP) or an application specific integrated circuit (ASIC) configured to perform functionality described herein.

The routing subsystem 102a may be configured to receive I/O operations from clients 118 using, for example, an external application-programming interface (API) and to translate client I/O operations into internal commands. In some embodiments, the routing subsystem 102a is configured to receive commands from small computer system interface (SCSI) clients 118. In certain embodiments, the system 100 may store data in fixed-size chunks, for example 4K chunks, where each chunk may have a unique hash value (referred to herein as a "chunk hash," which in certain embodiments is the same as a hash digest). In such embodiments, the routing subsystem 102a may be configured to split data into fixed-size chunks and to calculate the corresponding chunk hashes. In one embodiment, chunk hashes are calculated using Secure Hash Algorithm 1 (SHA-1) processing. In some embodiments, a chunk corresponds to a fixed number of contiguous blocks within a storage device.

The control subsystem 102b may be configured to maintain a mapping between I/O addresses associated with data and the corresponding chunk hashes. As shown in FIG. 1C, this mapping may be maintained using a data structure 112, referred to herein as an "I/O address to chunk hash mapping table" or "A2H table," (also known as A→H table) according to some embodiments. In one embodiment, I/O addresses may be logical addresses used by clients 118 to access data within the storage system 100.

The data subsystem 102c may be configured to maintain a mapping between chunk hashes and physical storage addresses (i.e., storage locations within the storage array 106 and/or within individual storage devices 108). This mapping may be maintained using a data structure 114, referred to herein as a "hash to physical address mapping table" or "H2P table," or "H→P table," according to some embodiments, where this table, in certain embodiments, includes information similar to that of the aforementioned HMD (hash metadata) and PL (physical layout) tables. In certain embodiments, as described, for example, in the incorporated by reference patents, there also may be a mapping referred to as the H2D or H→D table, where D stands for disk physical layout, In certain embodiments, the H2P table is maintained to route data with different hashes to different D modules. The data subsystem 102c may be also be configured to read and write data from/to the storage array 106 (and/or to individual storage devices 108 therein).

It will be appreciated that combinations of the A2H 112 and H2P 114 tables may provide multiple levels of indirection between the logical (or "I/O") address a client 118 uses to access data and the physical address where that data is stored. Among other advantages, this can give the storage system 100 freedom to move data within the storage array 106 without affecting a client's 118 access to that data (e.g., if a storage device 108 fails).

The management subsystem 102d may be configured to monitor and track the status of various hardware and software resources within the storage system 100. In some embodiments, the management subsystem 102d may manage the allocation of memory by other subsystems (e.g., subsystems 102a-102c) using techniques described below in conjunction with FIGS. 2-6. In some embodiments, the management subsystem 102d can also be configured to monitor other subsystems 102 (e.g., subsystems 102a-102c) and to use this information to determine when the storage system 100 may begin processing client I/O operations after a restart.

A subsystem 102 may store various types of information within primary memory 118. For example, the control subsystem 102b may store some or all of the information within the A2H table 112 in primary memory 118. Likewise, the control subsystem 102c may store some or all of the information within the H2P table 114 in primary memory 118. In some embodiments, subsystems 102 cache metadata within primary memory 118 to improve system performance. In some embodiments, a subsystem 102 may maintain a change journal to efficiently handle changes to metadata or other information. Such change journals may also be stored in primary memory 118. For example, in certain embodiments, a subsystem's dynamic memory requirements may include metadata used to process I/O operations. In other embodiments, metadata stored within a process memory space may include address-based metadata (e.g., information used within the A2H table 112 of FIG. 2) and hash-based metadata (e.g., information used within the H2P table 114 of FIG. 2). It will be appreciated that the actual amount of metadata used by a subsystem may depend on the client I/O patterns which, in general, are a priori unknown. Thus, in some embodiments, a fixed amount of memory is allocated to each subsystem for metadata and it is left to the subsystem (or its components) to utilize the memory as appropriate. In one embodiment, a subsystem 102 may require up to 128 GB of primary memory to function normally.

It is not always possible to achieve straightforward mapping between how data is presented to a host, and how data are stored. Thus, when a system fails (e.g., due to hardware or software issues), the flexibility in decoupling and virtualization can result in complexity in recovery processes and difficulties in achieving consistency between data and various layers of metadata, as well as within the metadata itself.

In addition, one of the most important functions of an external storage system such as the DELL EMC XtremIO product, is to provision storage to host and applications, often in the form of a logical volume. It is crucial to preserve data consistency of user volumes in such systems. Content addressable systems such as XtremIO clusters are rich in metadata; with every module (Routing/Control/Data) along the data path performing a certain level of I/O mapping and conversion operations to enable a rich set of data services, as discussed above in connection with FIGS. 1A-1C. To maintain metadata consistency, almost every module maintains one or more types of metadata journals, and, in some configurations, different layers, or stacks within the system have their own respective journals.

Metadata Journals can be used to preserve the consistency between volume metadata and data so that, if there is a system failure and reboot, a persisted journal can be used for system recovery. Metadata journals also can be useful if there is a need to upgrade a system or perform some other task that has a risk of destabilizing the state or configuration of one or more system components. In certain embodiments, the system by design relies on reliable journaling and thus assumes consistent metadata all the time. However, if a given journal fails to persist, or does not persist correctly, an administrator may have to use traditional approaches to system recovery, such as to restore from backup, or manually fix on disk metadata configuration and data. Those approaches can require taking system offline in a prolonged period time, extreme expertise in on disk data/metadata layout and content, or both. Even so, there is no guarantee that the system can be recovered if the configuration has changed/lost, or metadata failed to persist on-disk. Thus, ensuring metadata consistency can be important to help enable data recovery.

In various embodiments, as described further herein, the storage system 100 of FIG. 1C may utilize techniques described below in connection with FIGS. 2-8 to provide various types of checks for metadata consistency, including an on-disk, online metadata backup consistency check and an online A2H metadata scanner.

To sustain the storage system during disastrous events, the metadata needs to be persisted on disk. In some content addressable storage systems, such as the DELL EMC XtremIO product, in some operations, especially during snapshot merge/delete, multiple metadata updates needs to be performed in one transaction, and journaling is the common practice to ensure metadata consistency. However, if for some reason some journal entries get lost, metadata consistency could be broken, which might lead to data corruption in snapshots and eventually might propagate to the entire snap group. Thus in accordance with certain embodiments described herein, it is desirable to have an address to hash (A2H) metadata scanner and/or and A2H disk metadata scanner, where each scanner can help to detect and fix consistency issues, without impacting the normal system services.

In certain embodiments, as described further herein, an A2H metadata scanner (which can be implemented, in certain embodiments, as any one or more of a method, a system, and an apparatus) performs a comprehensive A2H metadata scan online without system downtime, while the scanning process verifies data path metadata records with the management object database, and verifies consistency of metadata between dirty tree and hash tree. Whenever metadata inconsistency is found, the A2H scanner tries to fix the inconsistency by recovering lost metadata operations based on the scenarios that could lead to inconsistency in the first place. This is explained further herein at least in connection with the processes described in FIGS. 2-6.

In certain embodiments, an A2H disk (HB_BKUP) scanner design (which can be implemented, in certain embodiments, as any one or more of a method, a system, and an apparatus) can perform a comprehensive A2H on disk metadata scan without requiring system downtime, while the scan verifies data path disk metadata records between management object database and dirty tree (DT) metadata. The A2H disk scanner also is referred to herein as an online, on-disk, metadata backup consistency scanner. Whenever metadata inconsistency is found (which, in certain embodiments, means the metadata is wrong or corrupt and should be discarded), the A2H disk scanner tries to remove the corrupted metadata record by triggering a journal process that does a read/modify/write of disk metadata and then discards the corrupted metadata during the read/modify/write process. This is described further herein at least in connection with the processes described in FIGS. 2, 7, and 8.

In certain embodiments, the hb_backup metadata corresponds to the A2H metadata that is configured in an on-disk presentation. In certain embodiments, an online journal destage is performed to persist all hb_backup metadata of snapshots and their ancestors on disk. Destaging, in certain embodiments, involves writing new or updated data from a cache or nonvolatile storage to a direct access storage device (e.g., a primary or backup storage device). To minimize metadata on disk amortization, in some embodiments, a priority is sometimes established wherein the most active pages are destaged first.

One challenge with flushing out dirty pages or other dirty information (e.g., the metadata journals) is that the destage operation, in certain embodiments, needs to be performed online (i.e., while the system and its applications are running, e.g., while the storage system is in an operational mode) with no impact to host applications, nor suspension of I/O, nor system timeout, without taking system offline, etc. If a cluster experiences power loss and battery unit failure in the middle of serving I/O, recovery from journal is very difficult if the on disk copy of journal and metadata is not consistent.

In certain embodiments, each type of A2H metadata scanner described above (e.g., the online backup disk metadata scanner of FIGS. 2, 7-8 and the online background metadata scanner of FIGS. 2-6) is built on top of a snapshot tree volume mapping technology, such as that described in a content addressable system that was described in patent USPTO-9,141,290, which is incorporated by reference, but this is not limiting.

In certain embodiments, there are three types of metadata that make up the A2H in memory metadata that is referenced herein:

1. Snap group control block metadata (also referred to herein as configuration metadata), which is used to maintain volume snap tree hierarchy. Each volume node on the snap tree is assigned a LU_index, unique within the tree.

2. Hash tree (HT) metadata, which is used to describe logical address to hash handle mapping of each individual volume, where HT metadata describes the basic content of the individual volume. Each volume is assigned an internal LU ID, unique within the cluster.

3. Dirty tree (DT) metadata, which is used to describe whether a block has been changed for a give volume comparing to its parent. It marks the difference among volumes in the same snap tree. The dirty tree is used to quickly look up block location (which volume to read from) during read operations and marks the existence of a block for a particular volume or group of volumes.

In certain embodiments, for a disk copy of the metadata (i.e., for scanning the on-disk copy of the metadata), for DT, there are few changes in snapshots in many use cases. Thus, DT disk metadata size is usually small. In addition, to save space and disk access time, the DT data can be highly compressed, and different snap groups, LUNs, and offsets can share the same DT page. In contrast, in certain embodiments, HT metadata directly maps to corresponding A2H hash entries, so not much savings can be done through compression. Thus, in certain embodiments, each LUN has its own disk metadata page. This is all taken into consideration in at least some of the scanning processes described herein.

Normally the snap group tree, DT, and HT content are in sync with each other. When there is metadata inconsistency, however, the trees may be out of sync, and this inconsistency potentially could cause issues such as described further below. In particular, any or all of these three types of metadata can develop problems, such as inconsistencies, that potentially could result in data crashing.

For example, one type of corruption can occur when there are DT entries belonging to a valid snap group but which have an invalid LU index. This corruption could happen if one or more previous snap merge/delete processes were aborted prematurely. Also, data corruption could happen if the LU index is reused later when new snapshots in the same group are created.

Another example of corruption occurs when there is a valid volume, but one or more data blocks may have HT entries but no corresponding dirty bits set in DT. This corruption could happen during volume merge or write shadowing, when data block ownership movement was interrupted in the middle of the volume merge or write shadowing. In this instance, DT entries were updated but HT entries were not. This type of corruption does not necessarily cause issues in host data access. However, if there is this corruption, the garbage HT entries might be picked up during snap diff operation for replication.

Still another example of corruption can occur when there is a valid volume, but some data blocks may have DT bits set but no corresponding HT entries. This could happen if some of a HT or DT journal read (JR) entries were lost during HA events and failed to recover. This could potentially cause a "hash not found" type of error if initiator tries to read the block.

A still further type of corruption occurs when there are DT entries with invalid snap groups. This occurs when an entire snap group is deleted, but because of a High Availability (HA) event, not everything was deleted cleanly on disk. A snap group is a collection of volumes in the same snap tree. In some rare HA events leading to Journal loss, such as inappropriate abort during Journal full, or failure to fully destage journal during node failover fallback, volume delete background process might be aborted without on disk metadata fully cleaned up. Later on when the snap group this volume belonged to is deleted, the left over volume metadata becomes garbage metadata with invalid snap group ID and volume ID. Thus, on disk, the system can end up some entries having an invalid snap group ID. In certain embodiments, this is the type of corruption that only this process (i.e., the backup consistency check, where in certain embodiments backup means disk) can fix.

There is also an additional type of corruption that occurs when there are HT entries with invalid LUNs. However, in at least some embodiments, it is not necessary to attempt to proactively clean up or correct for this type of corruption. This is because HT entries of different LUNs are stored as different disk metadata pages, which enables a system to be able to tell whether it should discard the page or not when we need, so we don't need to proactively clean it up.

To detect and, optionally, correct (including proactive correction, before any corruption or error affects the system or is reported by the system), some or all of the above types of corruption (other than the HT entries with invalid LUNs), in certain embodiments, different types of scanners are provided to scan the system at different types to determine if a given type of corruption is present and, optionally, to fix the corruption. Different types of scanners are advantageous because the various types of metadata are loaded into different parts of the system at different times. For example, when a system (e.g., the system of FIGS. 1A-1C) boots up, the system does not necessarily need all three types of metadata, because of the nature of the boot up sequence. In addition, because of the boot up sequence, some of the potentially inconsistent metadata might not get loaded into memory at all, so detection of it will require a particular type of scanning, whereas detection of inconsistencies or other corruption in metadata loaded into memory can require yet another type of scanning.

For metadata that is loaded into memory during boot up and which could have corruption and/or be inconsistent, it can be advantageous to use one or more online metadata scanning processes that are able to scan in the background while still serving host/user I/O and not interfering substantially with host/user I/O, as described at least in FIGS. 2-6 herein. That is, the in-memory metadata possibly could be used to serve host/user I/O (e.g., read and write operations), so it is advantageous to ensure that scanning, and/or cleaning processes are not impacting host I/O.

Figure 2:
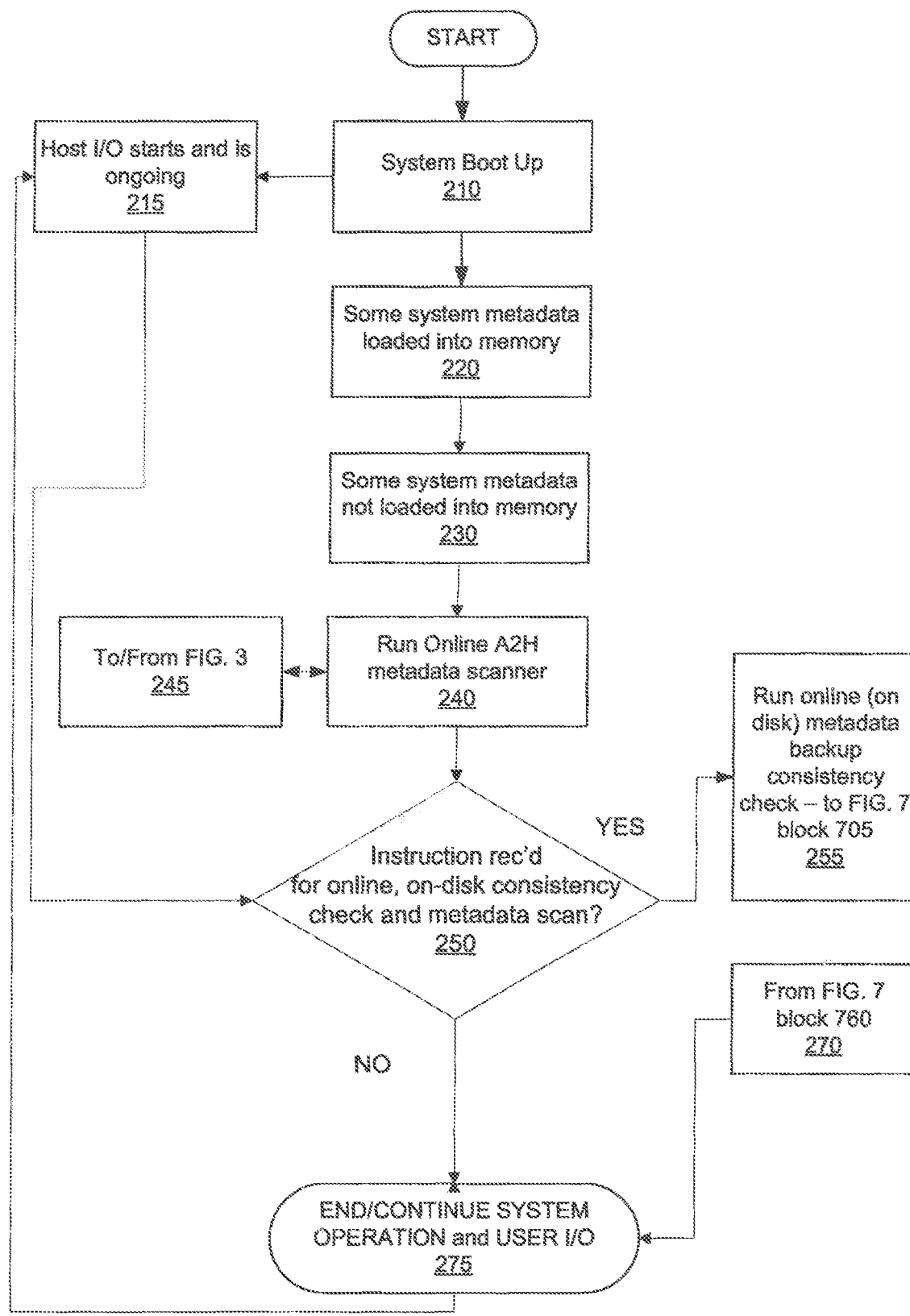
FIG. 2 is a simplified flowchart of an overall method for verifying metadata consistency for the systems of FIGS. 1A-1C, in accordance with at least one illustrative embodiment of the instant disclosure.
Figure 7:
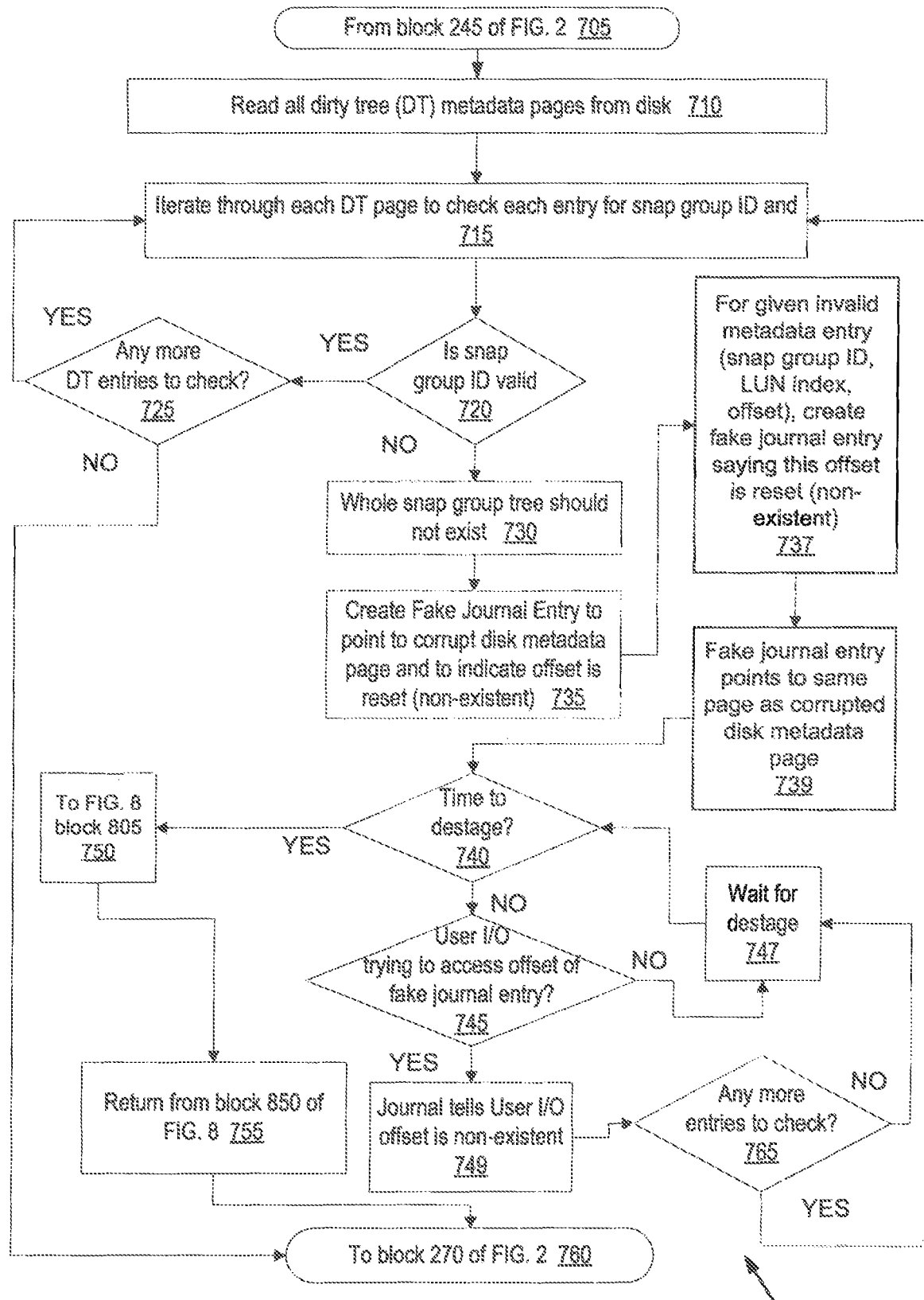
FIG. 7 is a simplified flowchart of actions occurring during an on-disk metadata consistency check, for the data storage system of FIGS. 1A-1C, which is usable as part of the method of FIG. 2, in accordance with at least one illustrative embodiment of the instant disclosure.
Figure 8:
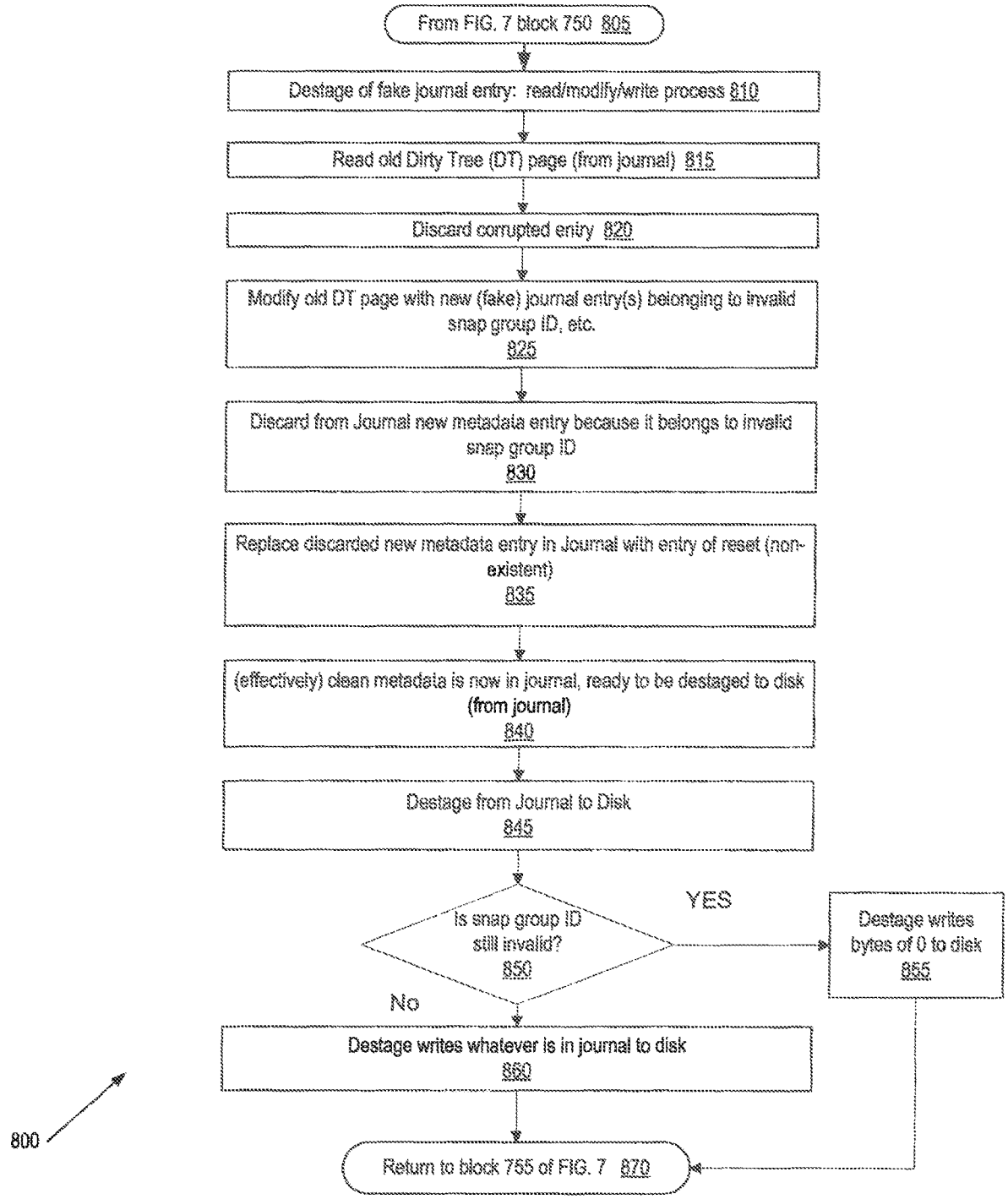
FIG. 8 is a simplified flowchart of actions occurring a destage process of the on-disk metadata consistency check of FIG. 7.

For metadata that is not loaded into memory during boot up, but which could have corruption or be inconsistent, it can be advantageous to use online, on-disk metadata scanning process(es), as described at least in FIGS. 2, 7, and 8 herein. This type of on-disk metadata does not have substantial impact on or interaction with host I/O activities. In certain embodiments, the online, on-disk metadata scanning process is configured for loading some time after boot up, such as on demand, or running when particular events take place.

In certain embodiments, at least some of the scanning processes are implemented in the form of an add on tool to existing system software, which can be advantageous because it does not alter the regular flow of the software or other data flow, nor does it substantially alter the system behavior, but this is not limiting.

FIG. 2 is a simplified flowchart of an overall method 200 for verifying metadata consistency for the systems of FIGS. 1A-1C, in accordance with at least one illustrative embodiment of the instant disclosure. At the time of system boot up (block 210), certain types of system metadata (such as address to hash (A2H) metadata, metadata associated with hash tree (T) and dirty tree (DT) discrepancies, etc.) is loaded into memory (block 220), and certain other types of system metadata (such as disk copies of DT and HT metadata (block 230) are not loaded into memory. In parallel with this, I/O with the host starts and continues (block 215) while the system is operating.

In certain embodiments, the online A2H metadata scanner runs automatically (block 240-245), and either fixes the issues or reports results, if applicable, without system downtime or affecting the host/user I/O. Details of the online A2H metadata scanning process(es) are described further herein, in connection with FIGS. 3-6. Referring still to FIG. 2, in accordance with block 250, checks for the online, on-disk metadata can be performed at any desired time, including on-demand, such as upon receipt of a particular instruction to run the check, upon occurrence of a predetermined condition or operation that involves access to the metadata on the disk, when the journal is full and being written to disk, etc. If a request is made to run the on-line, on disk metadata scanner, the process of FIG. 7 is run (block 255) and when the scan is complete processing returns (block 270). By the time processing reaches block 275, the system has at least run the online A2H metadata scanner of blocks 240-245, and may or may not have run the online, on-disk metadata backup consistency scan of blocks 255 and 270. Processing returns to block 215 (to indicate host I/O is ongoing), but, as the process flow of FIG. 2 indicates, the system still is responsive to any indication that it should perform the online, on-disk metadata backup consistency scan of blocks 240-245, whether for a first time or another time after the first time.

The two different types of scanning of metadata shown in FIG. 2 (the online A2H metadata scanner in block 240 and the online, on-disk metadata backup consistency scanner in block 255), do not have to be run in any particular order: the scanner of block 240 runs after or as part of boot up, whereas the scanner of block 255 can run at any desired time. The two scans, in certain embodiments, can run at substantially the same time and/or at times that completely or partially overlap each other.

Figure 3:
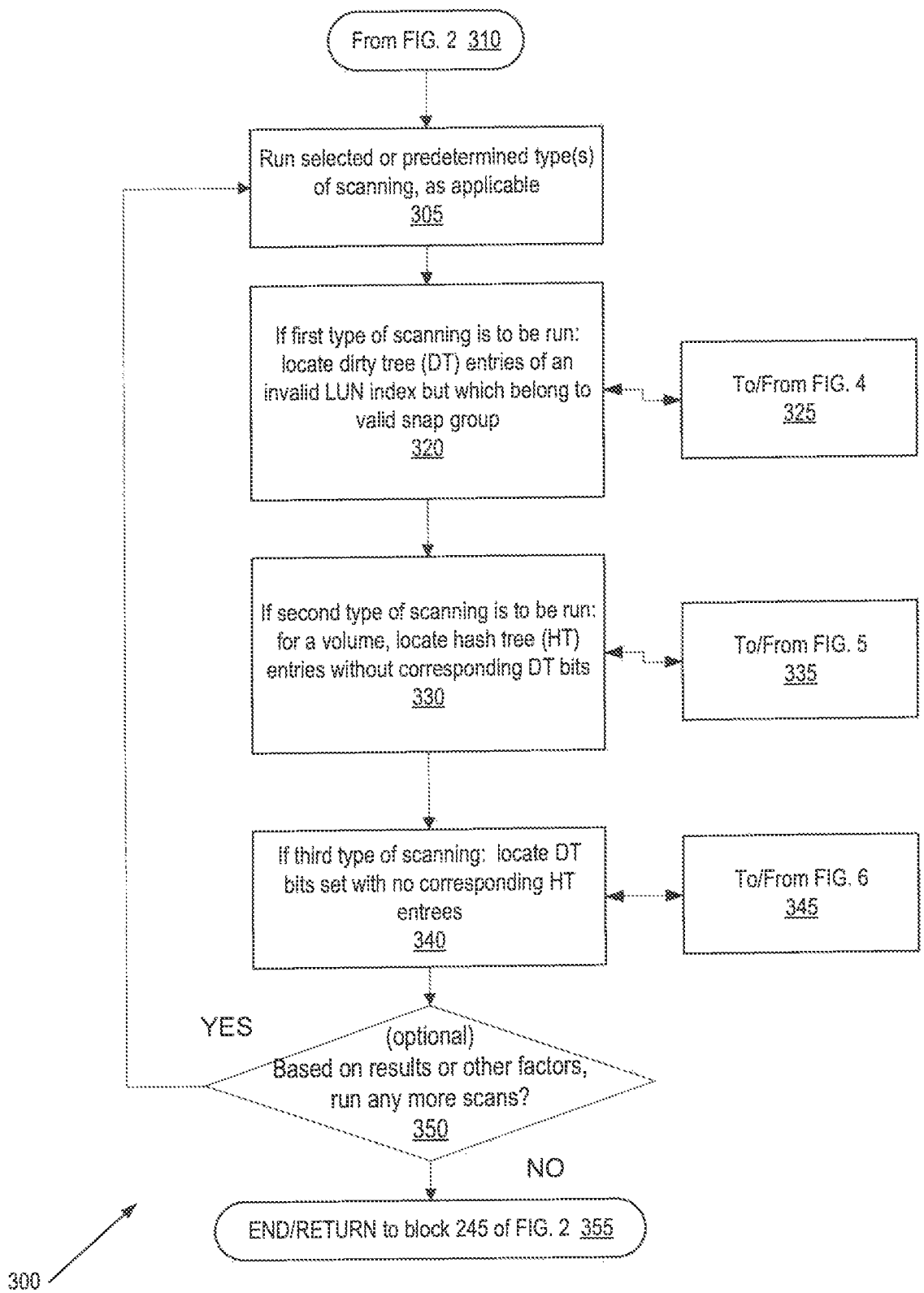
FIG. 3 is a simplified flowchart of actions associated with an online address to hash (A2H) metadata scanning process for the systems of FIGS. 1A-1C, which is usable as part of the overall method of FIG. 2, in accordance with at least one illustrative embodiment of the instant disclosure.

FIG. 3 is a simplified flowchart of actions associated with an online address to hash (A2H) metadata scanning process 300 for the systems of FIGS. 1A-1C, which is usable as part of the overall method of FIG. 2, in accordance with at least one illustrative embodiment of the instant disclosure. FIG. 3 helps to look for a metadata inconsistency condition in the systems of FIGS. 1A-1C, where in certain embodiments it can determine if a metadata inconsistency condition exists by checking whether any metadata inconsistency sub-conditions (e.g., the conditions detected by the first, second, and third types of scanning referred to in blocks 320, 330, and 340, respectively). Recall that, as noted above, that the snap group trees (DT, and HT) content are supposed to be in sync with each other and that metadata inconsistency in the three types of metadata (snap group control block, HT, and DT) can cause the trees to become out of sync and that various system problems can arise. As noted previously, these problems can include (a) DT entries belonging to a valid snap group but which have an invalid LU index; (b) in a valid volume, one or more data blocks may have HT entries but no corresponding dirty bits set in DT; and (c) in a valid volume, some data blocks may have DT bits set but no corresponding HT entries.

For the three types of metadata and the aforementioned three types of problems (a)-(c) noted above, the method 300 of FIG. 3 has the three rounds of scanning shown in blocks 320, 330, and 340, respectively, as discussed further below. Note that the order shown in FIG. 3 for the three rounds of scanning of blocks 320, 330, and 340 is not limiting. In certain embodiments, each round of scanning in FIG. 3 is independent of the others and does not require any of the others to run for it to run. Moreover, as shown in block 305, in certain embodiments, a user or other entity controlling the process 300 of FIG. 3 may determine selectively (e.g., based on other system conditions) to run only a certain one or more of the scanning processes of FIG. 3 and not the other processes. In certain embodiments, a user or other entity controlling the process 300 of FIG. 3 may choose to run one or more rounds of the scanning of FIGS. 4-6 in check/detect mode only (discussed further below) and then, based on the returned results (block 350 of FIG. 3), may determine whether any one or more of the other scanning rounds needs to be run, whether any scanning needs to be repeated, etc., such that, in certain embodiments, the process 300 is customizable based on need and/or based on actual detected inconsistencies.

In certain embodiments, to enable the online metadata scans of FIG. 3 occur in parallel with host I/O and other system activities (as shown in FIG. 2), the scanner locks snap group and logical address space in sub-LUN granularity and scans one sub-LUN at a time. In certain embodiments, each sub-LUN is 256 X-pages, so if an X-page is 8K (newer system), it is 2 MB, if an X-page is 4K (older system), it is 1 MB. For example, in certain embodiments, during a given metadata scan process, small chunks of blocks are scanned at the sub-LUN level, and during the scan, the I/O is held against that particular sub-LUN, and then released when the scan is complete, but this happens quickly enough, and the sub-LUN size is small enough, that it does not substantially impact host I/O performance. Note that, in certain embodiments, both HT and DT are sparse trees to save in memory footprint. In these sparse trees, the empty sub-LUNs do not have corresponding HT/DT leafs in memory. This is analogous to the sparse arrays described in the aforementioned, incorporated-by-reference U.S. Pat. No. 9,141,290 patent, where the sparse array uses actual physical memory only for actual values it holds. Such sparse arrays, in certain embodiments, can be visualized as trees. In certain embodiments, to discover existence of any HT/DT discrepancy efficiently, the scanning effectively provides independent HT and DT tree traverse routines for a given volume. This is explained further below.

Referring again to FIG. 3, the first type (or round) of scanning attempts to locate DT entries of an invalid LUN index, but which belongs to a valid snap group (block 320), and processing proceeds to and returns from the method shown in FIG. 4 (block 325), discussed further below. The second type (or round) of scanning attempts to locate, for a volume, HT entries without corresponding DT bits (block 330) and processing proceeds to and returns from the method shown in FIG. 5 (block 335). The third type (or round) of scanning attempts to locate DT bits set with no corresponding HT entrees (block 340) and processing proceeds to and returns from the method shown in FIG. 6 (block 345). Each of these scanning rounds implements an independent HT and DT tree traverse routine for a given volume. Optionally, in certain embodiments and as shown in FIG. 3, one or all of these scans can be re-run as well, such as, if the answer at block 350 is "Yes," then, as shown via the path in FIG. 3 that feeds back to block 305, the selected or predetermined types of scanning can run again. Else, if the answer at block 350 is "No," then, as shown in FIG. 3, the process ends (block 355) and returns to block 245 of FIG. 2.

Figure 4:
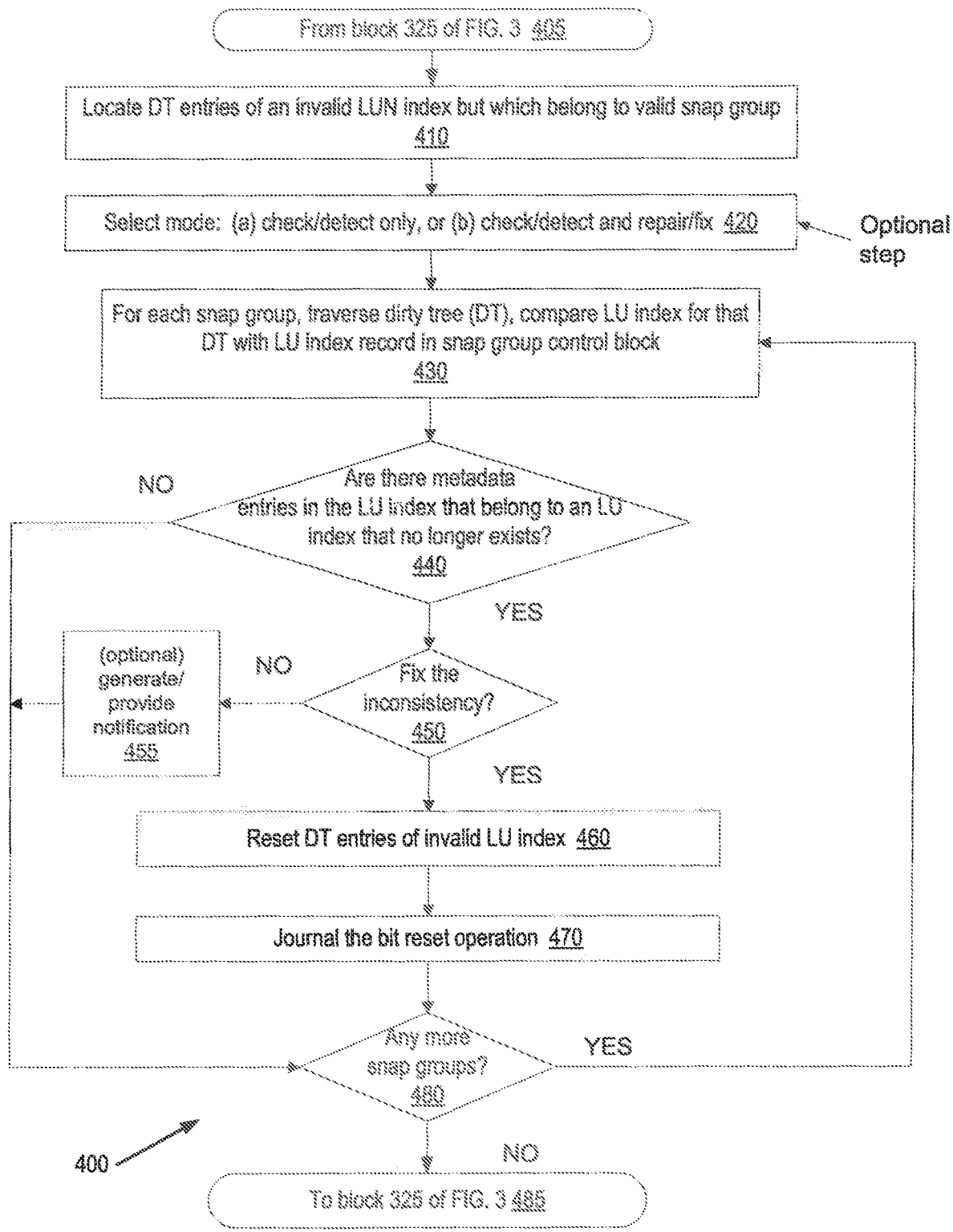
FIG. 4 is a simplified flowchart of actions occurring during a first type of metadata scanning process for the data storage system of FIGS. 1A-1C, which is usable as part of either or both of methods of FIGS. 2 and 3, in accordance with at least one illustrative embodiment of the instant disclosure.

In blocks 320-325, in certain embodiments, to find substantially all DT entries of an invalid LU index, the scanning process, in accordance with FIG. 4, traverses through a dirty tree (DT) of a snap group, and then compares the LU index with the LU index record in snap group control block. If DT entries of an invalid LU index are found, the scanner resets the DT entries of invalid LU index and journals the bit reset operation. The cleanup is transparent to host I/O, and helps to prevent issues in case the LU index is re-used and becomes valid. For example, suppose an inconsistency is permitted to exist, and an entity creates a new snapshot in the same snap group, such that the same LUN index (that is corrupted) needs to be used. In this situation, the DT entry (which is inconsistent and erroneous) potentially could corrupt the newly created snapshot. By cleaning up the inconsistency before this happens, this type of corruption potentially can be prevented before any new snapshot gets created.

Referring again to FIG. 4, FIG. 4 is a simplified flowchart 400 of actions occurring during a first type of metadata scanning process for the data storage system of FIGS. 1A-1C, which is usable as part of either or both of methods of FIGS. 2 and 3, in accordance with at least one illustrative embodiment of the instant disclosure. FIG. 4 implements the first round of scanning called by FIG. 3 and, in certain embodiments, can help to compensate for inconsistencies that arise if there is journal loss of information, such that even though a system views a given snapshot as being "gone" or deleted, there is still metadata in the snap group control block or in the dirty tree associated with that volume, which constitutes an erroneous inconsistency. Effectively, in certain embodiments, FIG. 4 helps to detect (and possibly correct) for invalid LUN data.

Referring now to FIGS. 3 and 4, in FIG. 4, the process begins after being called from block 325 of FIG. 3 (block 405). The process has at least one function of locating DT entries of an invalid LUN index but which belong to a valid snap group (block 410). Optionally, in certain embodiments, before the process runs, any entity running this process (e.g., a user or system) can determine or select if the process will merely check and/or detect such errors, or will not only check/detect but also repair/fix such errors (block 420). In some embodiments, a user or other entity may have selected the option to check/detect only, because it may be desired that the inconsistency be fixed in some other manner other than by the process of FIGS. 2-6, such as manually or by some other program or process. Or, in other embodiments, it may be desired that the inconsistency not be corrected, perhaps because correcting the inconsistency might adversely affect host I/O, or for any other applicable reason. In still further embodiments, a user or other entity running a given check may desire to selectively fix only certain detected inconsistencies or errors, as well, an may determine that other inconsistencies or errors do not yet need to be fixed.

In block 430, the scanner traverses the DT and compares the LU index for that DT with a corresponding LU index record in the snap group control block, to see if there re metadata entries in the LU index that belong to an LU index that no longer exists (block 440). That is, the process scans all the DT that belong to a given snap group to find out whether there am entries that belong to a LUN index that is no longer existing or that is no longer in the configuration database. This corresponds to a metadata inconsistency condition existing in the system, because the LU index for a given DT is supposed to match the corresponding LU index record in the snap control block.

If, after the check for metadata entries of block 440 shows that there are no entries that are found to be no longer existing (i.e., no problems, in that snap group, the answer at block 440 is "No"), then the process checks if there are any more snap groups to scan (block 480). If there are no more snap groups, the process of FIG. 4 concludes, and processing returns to block 325 of FIG. 3 (block 485). If there are more snap groups (answer at block 480 is "Yes"), the check of block 430 is repeated for each remaining snap group.

At block 440, if the answer is "Yes" (i.e., there are metadata entries in the LU index that belong to an LU index that no longer exists), then an inconsistency has been detected between the LU index for that DT and the LU index record in the snap control block. If the inconsistency is to be reported, but not fixed (i.e., answer at block 450 is "No", because in optional block 420 the mode (a) of check/detect only was selected), then, optionally, an alert or other notification is generated (block 455) to keep track of the inconsistency, and processing proceeds to block 480.

Referring again to FIG. 4, if the answer at block 450 is "Yes" (that is, to fix the inconsistency), then the scanner fixes it, in certain embodiments, as follows: reset DT entries of invalid LU index (block 460); and journal the bit reset operation (block 470). Processing then proceeds to block 480, as noted above. When all applicable snap groups have been scanned (answer at block 480 is "No"), then processing returns to block 325 of FIG. 3 (block 485). Depending on whether any of the other rounds of scanning are to be run, in FIG. 3 (e.g., as per blocks 305 and 350 of FIG. 3), other rounds may be run (e.g., the scanning of either or both of FIGS. 5 and 6), or any one or more of the scanning rounds may be repeated, etc., as described above.

Figure 5:
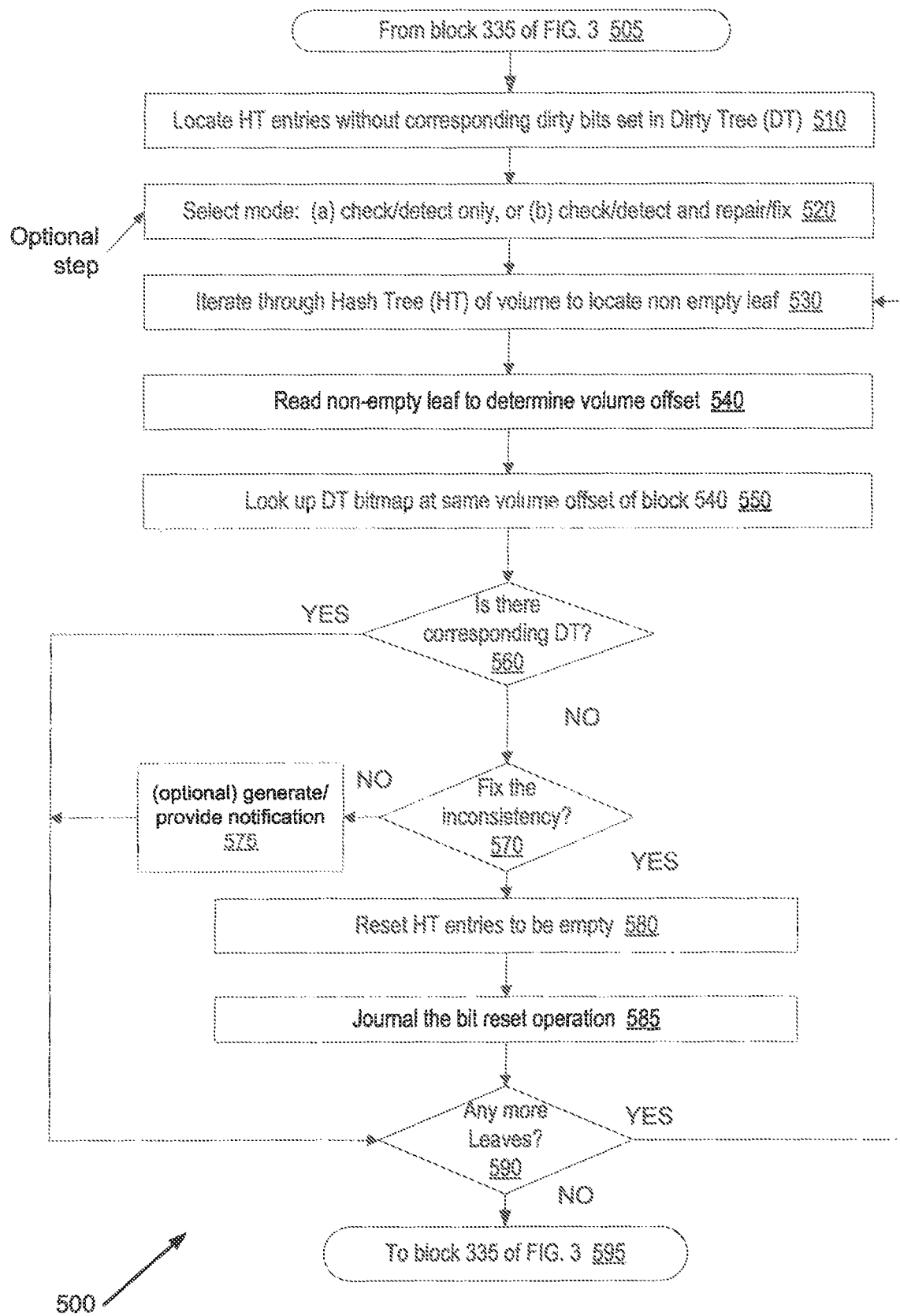
FIG. 5 is a simplified flowchart of actions occurring during a second type of metadata scanning process, for the data storage system of FIGS. 1A-1C, which is usable as part of either or both of the methods of FIGS. 2 and 3, in accordance with at least one illustrative embodiment of the instant disclosure.

FIG. 5 is a simplified flowchart 500 of actions occurring during a second type of metadata scanning process, for the data storage system of FIGS. 1A-1C, which is usable as part of either or both of the methods of FIGS. 2 and 3, in accordance with at least one illustrative embodiment of the instant disclosure. FIG. 3 can call the process 500 of FIG. 5 at blocks 330-335), if desired. The process 500 of FIG. 5 helps to check that all HT entries have corresponding DT blocks, so it helps to locate HT entries without corresponding dirty bits set in the DT (block 510). If an HT entry does not have a corresponding DT bit (or flag) set, then this can indicate that the HT may contain "garbage" or incorrect data. Note that, in certain embodiments, the HT marks what is the content saved at a particular address (a block address). Because both HT and DT are sparse trees, that means if a block or chunk of blocks is not written or allocated, the corresponding metadata entries will not be visible in the system. The process of FIG. 5 helps to compensate at least partially for this issue.

Referring to FIG. 5, in certain embodiments, a user, or other entity calling the method 500 can select whether to run the scan in check/detect only mode or in check/detect and repair/fix (block 520). The operation of and reasons for block 520 are substantially similar to those already discussed in connection with block 420 of FIG. 4, and its description is not repeated here. The scanning process 500 iterates through the HT of a volume to locate a non-empty "leaf" of the HT (block 530). When a non-empty leaf is located, it is read to determine the corresponding volume offset (block 540). That is, the scanner looks up the DT bitmap at the same volume offset (block 550). There should be 1:1 matching between the HT and DT and corresponding metadata entries in the system.

When the non-empty leaf (i.e., leaf with data) is read (block 540) and compared with the DT bitmap at the same volume offset (block 550), if there is a 1:1 correspondence (i.e., if there is a corresponding DT bit set for the HT entry), then there is no inconsistency for that non-empty leaf. That is, the answer at block 560 is "No" for that particular non-empty leaf, and processing progresses to block 590. If there are no more leaves to check (block 590), then processing returns to block 335 of FIG. 3 (block 595). If at block 590 there are more leaves to check, then processing returns to block 530 to continue iterating through the HT.

At block 560, if there was not a corresponding DT bit set at for the HT entry at that same volume offset (answer at block 560 is "No"), then an inconsistency is detected. If the inconsistency is not to be fixed for that non-empty leaf (answer at block 570 is "No"), then, optionally, a notification can be generated (block 575), in a manner substantially similar to the notification described above for block 455 of FIG. 4 (and not repeated here), and processing continues on to block 590. If, however, the inconsistency is to be fixed (answer at block 570 is "Yes"), then to fix the inconsistency, the scanning process 500 resets the corresponding HT entry or entries (which do not have DT bit set) to clear them, to help prevent issues in future snap deletes or merges. That is, the non-empty leaf in the HT is reset to be empty. This clean up (resetting the corresponding HT entry) is transparent to host I/O, because, in certain embodiments, the host read handling routine already looks up the DT first to find the block volume location. After the fix of block 580 is completed, the bit reset operation is journaled (block 585) and processing proceeds to block 590, until no more leaves in the HT need to be checked (answer at block 590 is "No)", at which point processing returns to block 335 of FIG. 3 (block 595).

Figure 6:
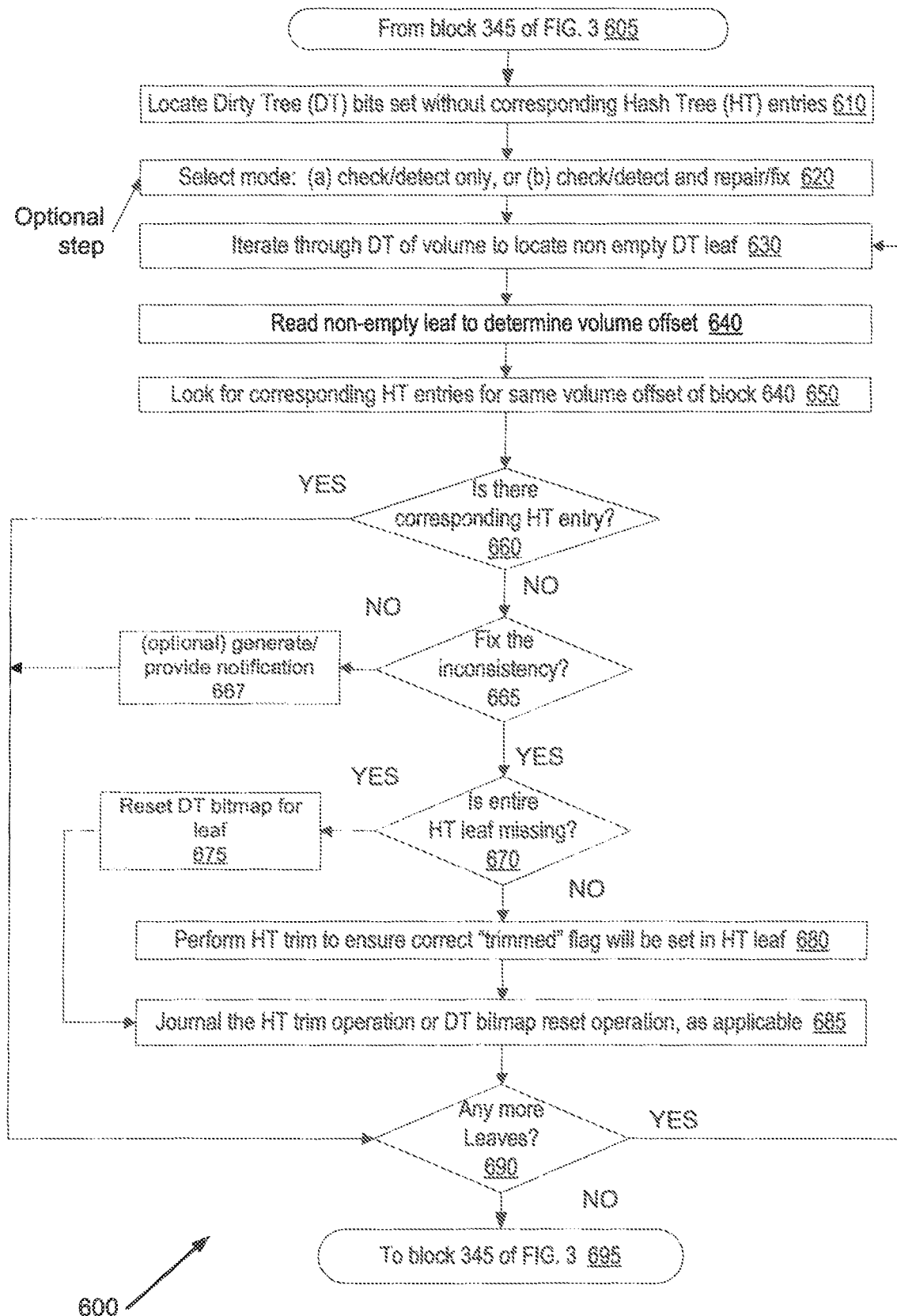
FIG. 6 is a simplified flowchart of actions occurring during a third type of metadata scanning process, for the data storage system of FIGS. 1A-C, which is usable as part of either or both of the methods of FIGS. 2 and 3, in accordance with at least one illustrative embodiment of the instant disclosure.

FIG. 6 is a simplified flowchart 600 of actions occurring during a third type of metadata scanning process, for the data storage system of FIGS. 1A-1C, which is usable as part of either or both of the methods of FIGS. 2 and 3, in accordance with at least one illustrative embodiment of the instant disclosure. In certain embodiments, the process 600 of FIG. 6 somewhat resembles an update to the process of FIG. 5, in that it performs the "reverse" type of check: that is, it attempts to find all the DT bits set with no corresponding HT entries (block 610).

Referring to FIG. 6, in certain embodiments, a user, or other entity calling the method 600 can select whether to nm the scan in check/detect only mode or in check/detect and repair/fix (block 620). The operation of and reasons for block 620 are substantially similar to those already discussed in connection with block 420 of FIG. 4, and its description is not repeated here.

The scanning process 600 iterates through the DT of a volume to locate a non-empty "leaf" of the DT (block 630). When a non-empty DT leaf is located, it is read to determine its volume offset (block 640). The scanner looks for corresponding HT entries associated with the same volume offset (block 650). As noted above, there should be 1:1 matching between the HT and DT and corresponding metadata entries in the system.

When the non-empty leaf (i.e., leaf with data) is read (block 640) and compared with the corresponding HT entry with the same volume offset (block 650), if there is a 1:1 correspondence (i.e., if there is a corresponding DT bit set for the HT entry), then there is no inconsistency for that non-empty leaf. That is, the answer at block 660 is "No" for that particular non-empty leaf, and processing progresses to block 690. If there are no more leaves to check (block 690), then processing returns to block 345 of FIG. 3 (block 695). If at block 690 there are more leaves to check, then processing returns to block 630 to continue iterating through the DT.

At block 660, if there was not a corresponding HT entry for the non-empty DT leaf, at that same volume offset (answer at block 660 is "No"), then the scanning method 600 has detected an inconsistency. That is, the hash handle is missing for a given dirty bit. If the inconsistency is not to be fixed for that non-empty leaf (answer at block 665 is no), then, optionally, a notification can be generated (block 667), in a manner substantially similar to the notification described above for block 455 of FIG. 4 (and not repeated here), and processing continues on to block 670. If, however, the inconsistency is to be fixed (answer at block 665 is "Yes"), then processing moves on to another check at block 670, to determine whether the entire corresponding HT leaf is missing.

If the entire HT leaf is missing (answer at block 670 is "Yes"), then there is no need to perform the HT trim (of block 680, discussed further below), and the fix for the inconsistency is instead to reset the DT bitmap for the leaf (i.e., set the DT bitmap to be null or empty) (block 675), then continue on to blocks 685 and 690 to journal the reset of the DT bitmap for the leaf and to check if any more leaves need to be scanned.

If the entire HT leaf is not missing (answer at block 670 is "No"), to fix the inconsistency, the scanning process performs an HT trim to ensure that the correct "trimmed" flag will be set in the ZHT leaf that does not properly correspond with the non-empty DT leaf (block 680). This clean up (setting the correct "trimmed" flag) is transparent to host I/O. In certain embodiments, the "trimmed" flag allows the A2H mapping layer to decide whether to check DT if a certain HT hash handle is not set. If the "trimmed" flag is not set in HT leaf, then there is no need to check the corresponding DT bit. Thus, the A2H mapping layer will inherit HT data from the volume ancestor. On the other hand, If "trimmed" flag in HT leaf is set, it is necessary to check the DT. If a corresponding DT bit is set, it means the page has been trimmed or set to all zero. After the fix of block 680 is completed, the setting of the correct trimmed flag is journaled (block 685) and processing proceeds to block 590, until no more leaves in the HT need to be checked (answer at block 590 is "No)", at which point processing returns to block 345 of FIG. 3 (block 595).

Referring briefly again to FIG. 2, the above-described scans that are done in connection with FIGS. 3-6 help to implement the online A2H metadata scanning functionality, which, in certain embodiments, is run in connection with or shortly after boot up. In block 250 of FIG. 2, if an instruction is received to perform an online, on-disk metadata scan, then processing moves to FIG. 7 (block 255). FIG. 7 is a simplified flowchart 700 of actions occurring during an online, on-disk metadata consistency check, for the data storage system of FIGS. 1A-1C, which is usable as part of the method 200 of FIG. 2, in accordance with at least one illustrative embodiment of the instant disclosure. The online disk metadata (background) scanning process 700 and/or online background disk metadata scanning can help detect and/or correct metadata inconsistencies via lightweight early detection of disk metadata inconsistency, without impact to host I/O or application data access.

As noted previously herein, DT disk metadata size can be small and highly compressed, where different snap groups, LUNs, and offsets can, in some instances, share the same DT page, whereas HT metadata directly maps to corresponding A2H has entries (thus not much compression can be done), so each LUN has its own disk metadata page. In certain embodiments, the scanning process of FIG. 700 is able to detect two types of corruptions: DT entries with invalid snap groups and HT entries with invalid LUNs. However, since HT entries of different LUNs are stored as different disk metadata pages, this enables the scanning processes of FIGS. 7 and 8 to be able to tell whether or not a page should be discarded, to help remove the need to proactively clean pages (e.g., DT related pages) that do not need cleaning.

For a given snap tree structure, if an entire snap tree structure should not exist (that is, the snap group ID is not valid), but it exists, then that constitutes one type of a corruption. The process of checking for this is detailed in FIG. 7. Referring to FIG. 7, the method 700 begins by reading all DT metadata pages from disk (block 710). In certain, embodiments, this is done by loading every DT disk metadata page and checking every entry on the pages by iterating through each DT page to check or scan each entry for snap tree ID (snapshot tree identifier, also referred to herein as snap group ID), which corresponds to a host group ID (block 715). For each entry on the DT page, there is supposed to be a snap group ID (snapshot group identifier) and a host map group ID. If the snap group ID does not exist, then it is effectively not "valid" (is invalid). If an entry of an invalid snap group ID is found (block 720), then the entry on the DT page needs to be cleaned up (blocks 730-160). If the snap group ID is valid (answer at block 720 is "Yes"), then it is not necessary for any cleanup, and the process 700 checks (block 725) for more DT entries in the DT page to scan. If there are more DT entries (answer at block 725 is "Yes"), then the iteration repeats starting at block 715.

If the answer at block 720 is "No" (snap group ID is not valid), then the whole snap group tree should not exist at all at the disk level (block 730). Because certain embodiments use journaling to write entries to disk, however, any modifications needed to change the info on the disk cannot be made directly to the disk but must instead be made in the journal. Thus, in the method 700, the changes to fix the metadata inconsistencies, in certain embodiments, are made to the journal. In particular, in certain embodiments, if the condition is that the snap group tree should not exist (block 730), then a fake journal entry is created (block 735), where the fake journal entry has the same associated info as does the invalid snap group ID (i.e., the same snap group ID, LUN index, and offset) but indicates that the offset is reset (i.e., set to be non-existing or empty) (block 737). The offset, in certain embodiments, is within a particular LUN where <snapgroup id, LUN index> defines a LUN. This way, the fake journal entry will point to the same journal disk as the corrupted metadata page, but the fake journal entry indicates that this offset is reset (i.e., set to be non-existing or empty). This fake journal entry is configured to point to the same page as the corrupted disk metadata page (block 739), so that when the journal entry eventually is flushed out to disk (in some embodiments, flushed out to permanent storage on the storage device), it will overwrite the corrupted information.

Note that normally, in certain embodiments, if a snap group ID is valid, the snap group ID has a LUN ID and an offset associated with it, with a DT bit set, wherein if the DT hit is set, it indicates that the entry "exists." So, in certain embodiments, one way to fax an error is to change the setting of the DT bit "indirectly" by altering the journal entry containing this information that will later be flushed out to disk (e.g., at the time of destaging, when journal entries are flushed out to disk)

Referring still to FIG. 7, the journal entry is configured to be flushed out when it is time to destage (block 740), which in certain embodiments can occur in a number of different ways, including but not limited to occurring a predetermined time or times, periodically, upon occurrence of a predetermined condition (e.g., when the journal is full), in response to an instruction received from a user or other entity, in response to conditions or instructions from other processes etc. Advantageously, the system running the method 700 determines when in the best time to flush data to disk/ destage. The information in the fake journal entry (created at blocks 735-737) needs to wait (i.e., answer at block 740 is "No") until the time of destage for it to be written to disk. In the meantime, the system moves on to check if any more entries need to be iterated through (block 765); else, it waits for destage (block 747) and also notes if user/host I/O attempts to access the offset of the fake journal entry.

In the meantime, even if the host I/O or user I/O interacting with the system attempts to access the offset corresponding to the same location of where fake journal entry needs to go (i.e., the location on the disk containing corrupt information), in certain embodiments, the user or other entity attempting access does not access the disk directly; rather, the journal takes priority. The attempt to access the invalid snap group ID can occur, for example, if a user creates a new snap group so that the snap group ID would then become valid, for example. In this situation, if the journal has not been written to disk, the correct behavior should be that the user I/O sees the offset as being not existing yet (when the user IO tries to access it). By creating the fake journal entry in block 735 (assuming the invalid snap group ID has been detected by the time a user I/O attempts to access the offset associated with the invalid snap group ID), the method 700 helps to ensure this correct system behavior actually occurs, because the user/host I/O or other entity actually is accessing the journal, not the disk.

Thus, effectively, the method 700 can intervene if a user attempts to access an invalid snap group ID, even if destage has not yet occurred, assuming the method has detected the corruption in the first place (block 745), because the method corrects the journal that I/O accesses. Specifically, referring to blocks 740-749 and 765 of FIG. 7, if a user I/O or host I/O attempts to access the offset on the disk corresponding to the corrupt information (i.e., the location where the fake journal entry eventually will go once the journal (as modified by fake journal entry) is flushed to disk), then the user or host I/O actually will see, in the journal, that the offset is reset (nonexistent). That is, the user I/O or other entity accessing the snap group ID or offset associated with it, only sees the fake journal entry, not the actual corrupted on disk information. This is because, as noted above, while the system is running, the user or host I/O does not directly access the disk, but instead is accessing the journal, which by time the method of FIG. 700 reaches block 745, has been "fixed" (i.e., is no longer corrupt), even if not yet flushed out.

Thus, the journal (now containing the fake journal entry) tells the entity that the offset is reset (nonexistent) (block 740), and the method 700 checks if any more entries need to be checked (block 765). If answer at block 765 is "Yes," the method proceeds to block 715 to continue checking. If the answer is "No," the method 700 waits for destage (block 747) and/or any additional attempts to access invalid snap group IDs.

Referring to block 740, if it is time to destage (answer at block 740 is "Yes"), then the method 700 proceeds to FIG. 8 block 805 (block 750) for the destage process. FIG. 8 is a simplified flowchart 800 of actions occurring during a destage process of the on-disk metadata consistency check of FIG. 7.

Referring to FIG. 8, the method 800 begins at block 805 to provide a destage of a fake journal entry, via a read/modify/write process (block 810). In certain embodiments, journal destage itself is implemented as an infinite loop running in the background of the system background, where journal destage destages a page each time. For each page, journal destage goes through all journal entries. Thus FIG. 8 illustrates a journal destage that should be done (in the infinite loop, in the background) for each page. It also should be understood that, in certain embodiments, the journal destage is used for destage of for every metadata change, not for corrupted entry fixes. Thus, if a given page has good entry change and also corrupted entry fix, the journal destage for that page will work on both of them.

Referring to FIG. 8, in block 815, the old DT page is read from the journal. Because the old DT page has a corrupted entry, the corrupted entry is discarded when the journal gets destaged, in favor of more updated information now in the journal (block 820). Then, the journal is modified with the more updated journal information—i.e., the new entry (the fake journal entry created in blocks 735-737), which fake journal entry is associated with the invalid snap group ID (block 825). However, because the new journal entry is itself fake and belongs to an invalid snap group ID, the new entry itself is discarded (block 830) and, effectively, replaced with an entry of reset (nonexistent) (block 835) at the location of the corrupted entry. Thus, journal now has clean metadata that is ready to be written (flushed out, destaged) to disk (block 840).

When the journal is destaged to disk (block 845), a check is made as to whether the snap group ID is still invalid (block 850). If the snap group ID is still invalid (answer at block 850 is "Yes"), the destage writes bytes of value zero (0) on disk (meaning, there is a blank, nothing in the field) (block 855). If the snap group ID becomes valid, the method 800 will write whatever is in the journal to disk (block 860), and the content in the journal (that is being written) is substantially ensured of being correct because of previous operations in FIGS. 7 and 8. The end result that is returned to block 755 of FIG. 7 (block 870) is that the corrupt entry with invalid snap group ID is discarded and the new disk metadata is clean.

Referring briefly to FIG. 7, when processing returns (block 755), the method 700 of FIG. 7 then returns to block 270 of IG. 2 (block 760). Referring briefly to FIG. 2, at block 270, the method 200 of FIG. 2 continues with system operation and user I/O (block 275), and ends when the system becomes non-operational, such as when it is shut down.

The above-described online A2H metadata scanner and online, on-disk metadata backup consistency scans/checks described above at least provide a method to detect metadata consistency in ways not heretofore seen in the art. At least some of the aforementioned embodiments, such as an A2H scanner that can scan for, correct, and even prevent data corruption in the snapshots before the issues propagate to application data. In contrast, at least some prior art systems fail to provide any built-in mechanisms to detect metadata inconsistency. Consequently, such metadata inconsistency issues may not be found until a given application starts to complain or otherwise provide alerts about data corruption.

To fix the metadata inconsistency, in at least some known systems, the system usually is taken offline, and metadata are examined and updated through combination of diagnostic tool and manual operation. Recovery in such systems thus can be lengthy and error prone. Furthermore, different snap groups, LUNs, and offsets can share the same DT metadata on-disk pages (different entries in the same page). To clean up a corrupted entry in the metadata page, in certain embodiments, as described herein, it is necessary to do a read/modify/write of an on-disk metadata page without host I/O or other upper layer data service triggers (as described above at least in connection with FIGS. 7-8). Known systems presently have no support for such operation. Thus, at least some of the embodiments described herein provide improved methods, systems, and apparatuses to address these issues.

In the above-described flow charts of FIGS. 2-8, rectangular elements, herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Further, the processes and operations described herein can be performed by a computer especially configured for the desired purpose or by a general-purpose computer especially configured for the desired purpose by another computer program stored in a computer readable storage medium or in memory.

Figure 9:
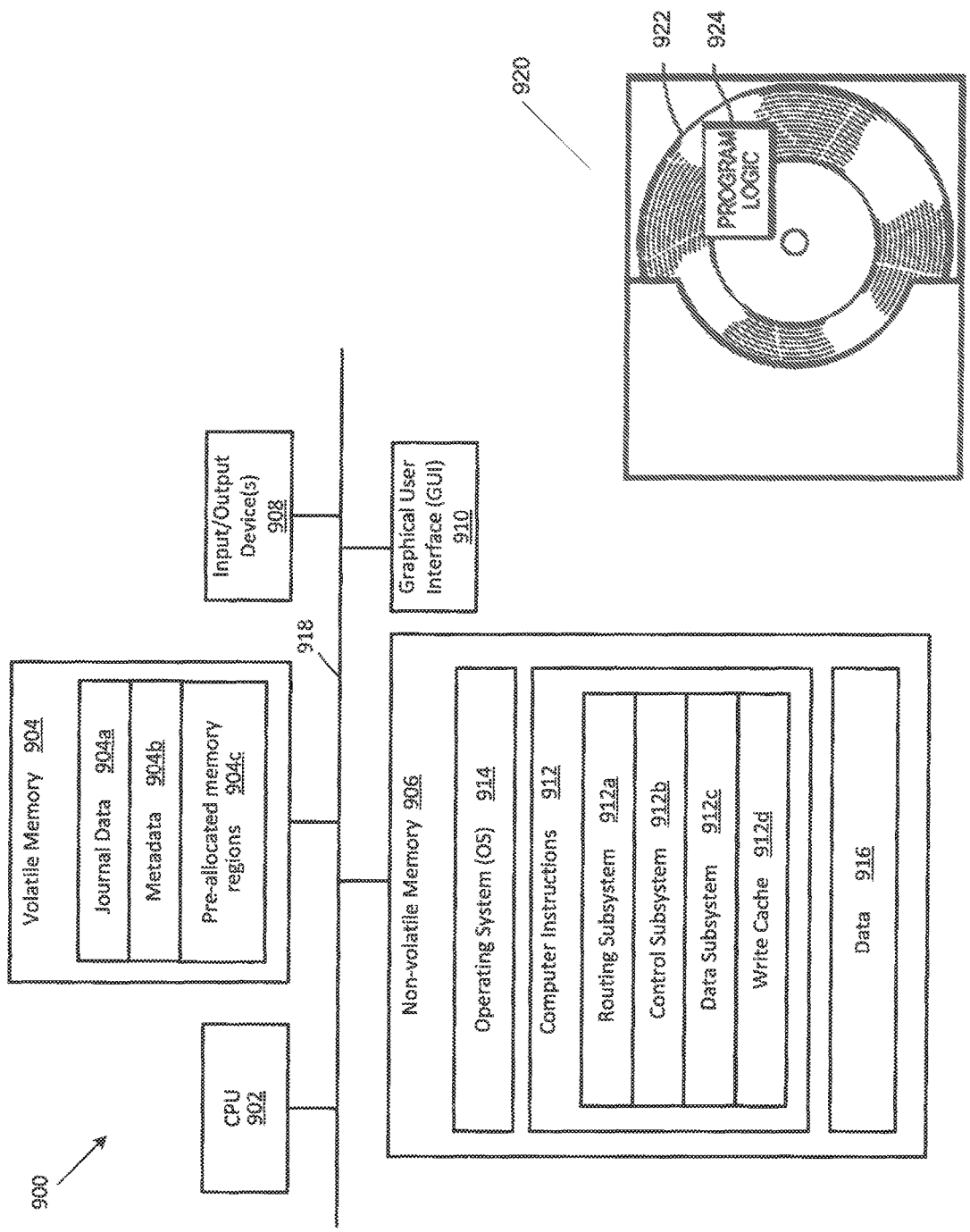
FIG. 9 is a simplified block diagram of an apparatus that may be used to implement at least a portion of the systems of FIGS. 1A-1C and at least a portion of the processes of any one or more of FIGS. 2-8.

FIG. 9 is a simplified block diagram of an apparatus that may be used to implement at least a portion of the systems of FIGS. 1A-1C and at least a portion of the processes of any one or more of FIGS. 2-8. As shown in FIG. 9, computer 900 may include processor 902, volatile memory 904 (e.g., RAM), non-volatile memory 906 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 910 (e.g., a touchscreen, a display, and so forth) and input and/or output (I/O) device 908 (e.g., a mouse, a keyboard, etc.). Non-volatile memory 904 stores, e.g., journal data 904a, metadata 904b, and pre-allocated memory regions 904c. The non-volatile memory, 906 can include, in some embodiments, an operating system 914, and computer instructions 912, and data 916. In certain embodiments, the computer instructions 912 are configured to provide several subsystems, including a routing subsystem 912A, a control subsystem 912b, a data subsystem 912c, and a write cache 912d. In certain embodiments, the computer instructions 912 are executed by the processor/CPU 902 out of volatile memory 904 to perform at least a portion of the processes shown in FIGS. 2-8. Program code also may be applied to data entered using an input device or GUI 910 or received from I/O device 908.

The processes of FIGS. 2-8 are not limited to use with the hardware and software described and illustrated herein and may find applicability in any computing or processing environment and with any type of machine or set of machines that may be capable of running a computer program. The processes described herein may be implemented in hardware, software, or a combination of the two. The logic for carrying out the method may be embodied as part of the system described in FIG. 9, which is useful for carrying out a method described with reference to embodiments shown in, for example, FIGS. 2-8. The processes described herein are not limited to the specific embodiments described. For example, the processes of FIGS. 2-9 are not limited to the specific processing order shown in FIGS. 2-8. Rather, any of the blocks of the processes may be re-ordered, combined, or removed, performed in parallel or in serial, as necessary, to achieve the results set forth herein.

Processor 902 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital, or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general-purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the program code is loaded into and executed by a machine, such as the computer of FIG. 9, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 9 shows Program Logic 924 embodied on a computer-readable medium 920 as shown, and wherein the Logic is encoded in computer-executable code configured for carrying out the reservation service process of this invention and thereby forming a Computer Program Product 922. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

The invention claimed is:

1. A computer-implemented method, comprising:
configuring a storage system comprising a processor in operable communication with a storage device, the storage system configured for responding to input/output (I/O) requests to the storage device from a host in operable communication with the storage system, the storage system comprising metadata configured to store information associated with at least one change to be made to information stored on the storage device;
configuring the storage system to load a first portion of metadata into a storage system memory during a bootup of the storage system, the first portion of metadata comprising metadata used to serve I/O requests from the host;
performing, after the first portion of metadata has been loaded, a first scan of at least the first portion of metadata loaded into storage system memory, wherein the first scan comprises a proactive scan that is configured to take place before the storage system allows further actions that make use of the first portion of metadata, the first scan configured to check for the existence of one or more metadata inconsistency conditions by checking for each of the following metadata inconsistency sub-conditions:
(a) dirty tree (DT) entries in the metadata which are associated with an invalid logical unit (LU) index;
(b) hash tree (HT) entries in the metadata which do not have corresponding DT bits; and
(c) DT bits set without having a corresponding HT entry;
wherein, in parallel with the first scan taking place and after the first portion of metadata has been loaded, the storage system is configured to be responsive to I/O requests from the host;
based at least in part on the results of the first scan, determining whether a first metadata inconsistency condition exists; and
based on the determination, proactively configuring further operation of the storage system after the first scan, wherein, if a determination is made that the first metadata inconsistency condition exists, the storage system is proactively configured to correct the first metadata inconsistency condition.

2. The method of claim 1, further comprising generating a notification if the first metadata inconsistency condition exists.

3. The method of claim 1, further comprising, if the first metadata inconsistency condition exists, taking a first set of actions to correct the first metadata inconsistency condition.

4. The method of claim 3, wherein the storage system further comprises a metadata journal and wherein the method further comprises journaling the first set of actions in the metadata journal.

5. The method of claim 1, wherein the method further comprises determining, based on at least one of the results of the first scan and a control signal, whether a second scan of the first portion of metadata needs to take place, wherein the second scan is configured to run an additional check for one or more of the (a), (b), and (c) metadata inconsistency sub-conditions.

6. The method of claim 1, wherein the storage system comprises a plurality of snapshot groups and corresponding snapshot group control blocks, each snapshot group comprising an associated DT having a respective logical unit (LU) index, each snapshot group control block comprising a respective LU index record, and wherein the detection of whether metadata inconsistency sub-condition (a) exists further comprises:
for each respective snapshot group in the storage system, traverse the associated DT to compare the LU index for the associated DT with the respective LU index record; and
if, based on the comparison, it is determined there are metadata entries in the LU index that have no match in the LU index record, then making a determination that metadata inconsistency sub-condition (a) exists.

7. The method of claim 6, further comprising if the metadata inconsistency sub-condition (a) exists, then fixing the metadata inconsistency sub-condition (a) by resetting to a nonexistent status any metadata entries in the LU index that have no match in the LU index record.

8. The method of claim 1, wherein the storage system comprises a logical volume comprising a HT and a DT, the HT comprising a plurality of HT leaves, each HT leaf associated with a respective HT leaf volume offset, the DT having an associated DT bitmap that comprises a plurality of dirty bits, wherein the detection of whether metadata inconsistency sub-condition (b) exists further comprises:
iterating through the leaves of the HT to locate a non-empty HT leaf;

reading the non-empty HT leaf to determine a first respective HT leaf volume offset for the non-empty HT leaf;
checking whether, in the DT bitmap, there is a first respective dirty bit set at a location in the DT bitmap corresponding to the first respective HT leaf volume offset; and
if, based on the check, it is determined there is no first respective dirty bit set at the location in the DT bitmap corresponding to the first respective HT leaf volume offset, then making a determination that metadata inconsistency sub-condition (b) exists.

9. The method of claim 8, further comprising if the metadata inconsistency sub-condition (b) exists, then fixing the metadata inconsistency sub-condition (b) by resetting the non-empty leaf in the HT to be an empty leaf.

10. The method of claim 1, wherein the storage system comprises a logical volume comprising a HT and a DT, the HT comprising a plurality of HT entries, each HT entry associated with a respective HT entry offset, the DT, the DT comprising a plurality of DT leaves, each DT leaf associated with a respective DT leaf volume offset, wherein the detection of whether metadata inconsistency sub-condition (c) exists further comprises:
iterating through the leaves of the DT of the volume to locate a non-empty DT leaf;
reading the non-empty DT leaf to determine the first respective DT leaf volume offset for the non-empty DT leaf;
checking whether, in the HT, there is a corresponding HT leaf and whether, in the HT leaf, there is a corresponding entry associated with the same volume offset as the DT leaf volume offset; and
if, based on the check, it is determined either that there is no corresponding HT leaf or that that there is no corresponding HT entry, then making a determination that metadata inconsistency sub-condition (c) exists.

11. The method of claim 10, wherein the DT further comprises a DT bitmap associated with the HT and further comprising, if the metadata inconsistency sub-condition (c) exists, then:
if there was no corresponding HT leaf, then resetting the DT bitmap to designate that the HT leaf is empty;
if there was no corresponding HT entry, then performing an HT trim to ensure that a correct trimmed flag is set in a corresponding HT leaf.

12. A system, comprising:
a processor; and
a non-volatile memory in operable communication with the processor and storing computer program code that when executed on the processor causes the processor to execute a process operable to perform the operations of:
configuring a storage system comprising a processor in operable communication with a storage device, the storage system configured for responding to input/output (I/O) requests to the storage device from a host in operable communication with the storage system, the storage system comprising metadata configured to store information associated with at least one change to be made to information stored on the storage device;
configuring the storage system to load a first portion of metadata into a storage system memory of the storage system during a bootup of the storage system, the first portion of metadata comprising metadata used to serve I/O requests from the host;
performing, after the first portion of metadata has been loaded, a first scan of at least the first portion of metadata loaded into storage system memory, wherein the first scan comprises a proactive scan that is configured to take place before the storage system allows further actions that make use of the first portion of metadata, the first scan configured to check for the existence of one or more metadata inconsistency conditions by checking for each of the following metadata inconsistency sub-conditions:
  (a) dirty tree (DT) entries in the metadata which are associated with an invalid logical unit (LU) index;
  (b) hash tree (HT) entries in the metadata which do not have corresponding DT bits; and
  (c) DT bits set without having a corresponding HT entry;
wherein, in parallel with the first scan taking place and after the first portion of metadata has been loaded, the storage system is configured to be responsive to I/O requests from the host;
based at least in part on the results of the first scan, determining whether a first metadata inconsistency condition exists; and
based on the determination, proactively configuring further operation of the storage system after the first scan, wherein, if a determination is made that the first metadata inconsistency condition exists, the storage system is proactively configured to correct the first metadata inconsistency condition.

13. The system of claim 12, wherein the storage system comprises a plurality of snapshot groups and corresponding snapshot group control blocks, each snapshot group comprising an associated DT having a respective logical unit (LU) index, each snapshot group control block comprising a respective LU index record, and further comprising computer program code that when executed on the processor causes the processor to perform the following actions as part of the detection of whether metadata inconsistency sub-condition (a) exists:
for each respective snapshot group in the storage system, traverse the associated DT to compare the LU index for the associated DT with the respective LU index record; and
if, based on the comparison, it is determined there are metadata entries in the LU index that have no match in the LU index record, then making a determination that metadata inconsistency sub-condition (a) exists; and
fixing the metadata inconsistency sub-condition (a) by resetting to a nonexistent status any metadata entries in the LU index that have no match in the LU index record.

14. The method of claim 12, wherein the storage system comprises a logical volume comprising a HT and a DT, the HT comprising a plurality of HT leaves, each HT leaf associated with a respective HT leaf volume offset, the DT having an associated DT bitmap that comprises a plurality of dirty bits, and further comprising computer program code that when executed on the processor causes the processor to perform the following actions as part of detecting whether metadata inconsistency sub-condition (b) exists:
iterating through the leaves of the HT to locate a non-empty HT leaf;
reading the non-empty HT leaf to determine a first respective HT leaf volume offset for the non-empty HT leaf;

checking whether, in the DT bitmap, there is a first respective dirty bit set at a location in the DT bitmap corresponding to the first respective HT leaf volume offset;

if, based on the check, it is determined there is no first respective dirty bit set at the location in the DT bitmap corresponding to the first respective HT leaf volume offset, then making a determination that metadata inconsistency sub-condition (b) exists; and fixing the metadata inconsistency sub-condition (b) by resetting the non-empty leaf in the HT to be an empty leaf.

15. The system of claim 12, wherein the storage system comprises a logical volume comprising a HT and a DT, the HT comprising a plurality of HT entries, each HT entry associated with a respective HT entry offset, the DT further comprises a DT bitmap associated with the HT and a plurality of DT leaves, each DT leaf associated with a respective DT leaf volume offset, and further comprising computer code that when executed on the processor causes the processor to perform the following actions as part of the detection of whether metadata inconsistency sub-condition (c) exists:

iterating through the leaves of the DT of the volume to locate a non-empty DT leaf;

reading the non-empty DT leaf to determine the first respective DT leaf volume offset for the non-empty DT leaf;

checking whether, in the HT, there is a corresponding HT leaf and whether, in the HT leaf, there is a corresponding entry associated with the same volume offset as the DT leaf volume offset;

if, based on the check, it is determined either that there is no corresponding HT leaf or that that there is no corresponding HT entry, then making a determination that metadata inconsistency sub-condition (c) exists;

if there was no corresponding HT leaf, then resetting the DT bitmap to designate that the HT leaf is empty; and if there was no corresponding HT entry, then performing an HT trim to ensure that a correct trimmed flag is set in a corresponding HT leaf.

16. The system of claim 12, further comprising computer program code that, when executed on the processor, causes the processor to perform the action of taking a first set of actions to correct the first metadata inconsistency condition, if the first metadata inconsistency condition exists.

17. The system of claim 12, further comprising computer program code that, when executed on the processor, causes the processor to perform the operation of determining, based on at least one of the results of the first scan and a control signal, whether a second scan needs to take place, wherein the second scan is configured to run an additional check for one or more of the (a), (b), and (c) metadata inconsistency sub-conditions.

18. A computer program product including a non-transitory computer readable storage medium having computer program code encoded thereon that when executed on a processor of a computer causes the computer to operate a storage system, the computer program product comprising:

computer program code for configuring a storage system comprising a processor in operable communication with a storage device, the storage system configured for responding to input/output (I/O) requests to the storage device from a host in operable communication with the storage system, the storage system comprising metadata configured to store information associated with at least one change to be made to information stored on the storage device;

computer program code for configuring the storage system to load a first portion of metadata into a storage system memory of the storage system during a bootup of the storage system, the first portion of metadata comprising metadata used to serve I/O requests from the host;

computer program code for performing, after the first portion of metadata has been loaded, a first scan of at least the first portion of metadata loaded into storage system memory, wherein the first scan comprises a proactive scan that is configured to take place before the storage system allows further actions that make use of the first portion of metadata, the first scan configured to check for the existence of one or more metadata inconsistency conditions by checking for each of the following metadata inconsistency sub-conditions:

(a) dirty tree (DT) entries in the metadata which are associated with an invalid logical unit (LU) index;

(b) hash tree (HT) entries in the metadata which do not have corresponding DT bits; and (c) DT bits set without having a corresponding HT entry;

computer program code for ensuring that, in parallel with the first scan taking place and after the first portion of metadata has been loaded, the storage system is configured to be responsive to I/O requests from the host;

computer program code for determining, based at least in part on the results of the first scan, whether a first metadata inconsistency condition exists; and computer program code for proactively configuring further operation of the storage system after the first scan, based on the determination, wherein, if a determination is made that the first metadata inconsistency condition exists, the storage system is proactively configured to correct the first metadata inconsistency condition.

19. The computer program product of claim 18, further comprising computer program code for taking, if a first metadata inconsistency condition exists, a first set of actions to correct the first metadata inconsistency condition.

20. The computer program product of claim 18, further comprising computer program code for determining, based on at least one of the results of the first scan and a control signal, whether a second scan of the first portion of metadata needs to take place, wherein the second scan is configured to run an additional check for a respective one or more of the (a), (b), and (c) metadata inconsistency sub-conditions.

* * * * *